(12) United States Patent
Tanaka et al.

(10) Patent No.: US 12,535,249 B2
(45) Date of Patent: Jan. 27, 2026

(54) COLD HEAT RECOVERY SYSTEM AND MARINE VESSEL OR FLOATING BODY

(71) Applicant: MITSUBISHI HEAVY INDUSTRIES, LTD., Tokyo (JP)

(72) Inventors: Toshimitsu Tanaka, Tokyo (JP); Ryo Takata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 18/107,337

(22) Filed: Feb. 8, 2023

(65) Prior Publication Data

US 2023/0251002 A1  Aug. 10, 2023

(30) Foreign Application Priority Data

Feb. 9, 2022 (JP) .................................. 2022-018363

(51) Int. Cl.
*F25B 30/06* (2006.01)
*B63B 25/14* (2006.01)
(Continued)

(52) U.S. Cl.
CPC .............. *F25B 30/06* (2013.01); *B63B 25/14* (2013.01); *F17C 9/04* (2013.01); *F25B 19/005* (2013.01);
(Continued)

(58) Field of Classification Search
CPC ........ F25B 30/06; F25B 19/005; F25B 41/20; B63B 25/14; F17C 9/04; F17C 2205/0323; F17C 2205/0352; F17C 2221/012; F17C 2221/033; F17C 2223/0153; F17C 2227/0135; F17C 2227/0323; F17C 2227/0355; F17C 2265/066; F17C 2270/0102; F01K 25/06; F01K 15/04;
(Continued)

(56) References Cited

U.S. PATENT DOCUMENTS

| 2013/0199185 A1* | 8/2013 | Wain | F01K 13/006 60/671 |
| 2016/0069220 A1* | 3/2016 | Wain | F01K 23/04 60/671 |
| 2023/0304731 A1* | 9/2023 | Barjhoux | F25J 1/004 |

FOREIGN PATENT DOCUMENTS

| JP | 2020147221 A | * | 9/2020 | ............. F02M 37/00 |
| KR | 20200012074 A | * | 2/2020 | ........ H01M 8/04216 |

\* cited by examiner

*Primary Examiner* — Jianying C Atkisson
*Assistant Examiner* — Ibrahim A. Michael Adeniji
(74) *Attorney, Agent, or Firm* — Birch, Stewart, Kolasch & Birch, LLP

(57) ABSTRACT

A cold heat recovery system includes a first cold heat recovery cycle including a first expansion turbine and configured to circulate a first heat medium, a second cold heat recovery cycle including a second expansion turbine and configured to circulate a second heat medium, a first heat exchanger provided on a downstream side of the first expansion turbine on the first cold heat recovery cycle and configured to transfer cold energy from a first fuel to the first heat medium, a second heat exchanger configured to transfer cold energy from a second fuel to the first fuel flowing on a downstream side of the first heat exchanger and reliquefy the first fuel, and a third heat exchanger provided on a downstream side of the second expansion turbine on the second cold heat recovery cycle and configured to transfer cold energy to the second heat medium from the first fuel flowing on a downstream side of the second heat exchanger.

12 Claims, 8 Drawing Sheets

(51) Int. Cl.
*F17C 9/04* (2006.01)
*F25B 19/00* (2006.01)
*F25B 41/20* (2021.01)

(52) U.S. Cl.
CPC ...... *F25B 41/20* (2021.01); *F17C 2205/0323* (2013.01); *F17C 2205/0352* (2013.01); *F17C 2221/012* (2013.01); *F17C 2221/033* (2013.01); *F17C 2223/0153* (2013.01); *F17C 2227/0135* (2013.01); *F17C 2227/0323* (2013.01); *F17C 2227/0355* (2013.01); *F17C 2265/066* (2013.01); *F17C 2270/0102* (2013.01)

(58) Field of Classification Search
CPC .......... F01K 25/10; F01K 25/08; F01K 23/08; F01K 7/16; F01K 11/02; Y02E 60/32; Y02E 20/14; B63H 21/38
See application file for complete search history.

COLD HEAT RECOVERY SYSTEM AND MARINE VESSEL OR FLOATING BODY

CROSS-REFERENCE TO RELATED APPLICATIONS

This application claims the benefit of priority to Japanese Patent Application Number 2022-018363 filed on Feb. 9, 2022. The entire contents of the above-identified application are hereby incorporated by reference.

TECHNICAL FIELD

The disclosure relates to a cold heat recovery system for recovering cold energy of fuel and a marine vessel or a floating body including the cold heat recovery system.

RELATED ART

A method for recovering and effectively using cold energy of a low-temperature liquid fuel such as liquefied natural gas (LNG) has been proposed.

JP 2020-147221 A describes a floating facility equipped with a power generation device that generates power using LNG cold heat. This power generation device includes a thermodynamic cycle using a heat medium as a working fluid and is designed to generate electric power in a generator connected to an expansion turbine driven by the heat medium (working fluid) flowing through a circuit. The thermodynamic cycle uses engine cooling water, seawater, or the like as a high-temperature heat source for heat exchange with the heat medium in an evaporator and uses LNG as a low-temperature heat source for heat exchange with the heat medium in a condenser. LNG is vaporized (regasified) in the condenser and then supplied to equipment or the like using natural gas as fuel.

SUMMARY

It has been proposed to use liquid fuel such as liquid hydrogen (LH2), which is different from LNG, as fuel for a marine vessel or the like, and it is conceivable to use a plurality of liquid fuels such as LNG and liquid hydrogen in combination in a marine vessel or the like. As described above, in using two types of liquid fuels in combination, recovering cold energy of the liquid fuel while efficiently vaporizing these two types of liquid fuels is awaited.

In view of the above circumstances, an object of at least one embodiment of the disclosure is to provide a cold heat recovery system capable of increasing output of a turbine in the cold heat recovery system as a whole and a marine vessel or a floating body including the cold heat recovery system.

A cold heat recovery system according to at least one embodiment of the disclosure includes a first fuel tank configured to store first fuel in a liquid state, a second fuel tank configured to store second fuel in a liquid state having a liquefaction temperature lower than a liquefaction temperature of the first fuel, a first fuel supply line for sending the first fuel extracted from the first fuel tank, a second fuel supply line for sending the second fuel extracted from the second fuel tank, a first cold heat recovery cycle configured to circulate a first heat medium and including a first expansion turbine for expanding the first heat medium in a gas state provided on the first cold heat recovery cycle, a first heat exchanger provided on a downstream side of the first expansion turbine on the first cold heat recovery cycle and configured to transfer cold energy from the first fuel flowing through the first fuel supply line to the first heat medium, a second heat exchanger provided on a downstream side of the first heat exchanger on the first fuel supply line and configured to transfer cold energy from the second fuel flowing through the second fuel supply line to the first fuel flowing through the first fuel supply line, a second cold heat recovery cycle configured to circulate a second heat medium and including a second expansion turbine for expanding the second heat medium in a gas state provided on the second cold heat recovery cycle, and a third heat exchanger provided on a downstream side of the second expansion turbine on the second cold heat recovery cycle and configured to transfer cold energy to the second heat medium from the first fuel flowing on a downstream side of the second heat exchanger on the first fuel supply line.

A marine vessel or a floating body according to at least one embodiment of the disclosure includes the cold heat recovery system.

According to at least one embodiment of the disclosure, a cold heat recovery system capable of increasing output of a turbine in the cold heat recovery system as a whole and a marine vessel or a floating body including the cold heat recovery system are provided.

BRIEF DESCRIPTION OF DRAWINGS

The disclosure will be described with reference to the accompanying drawings, wherein like numbers reference like elements.

DESCRIPTION OF EMBODIMENTS

Figure 1:
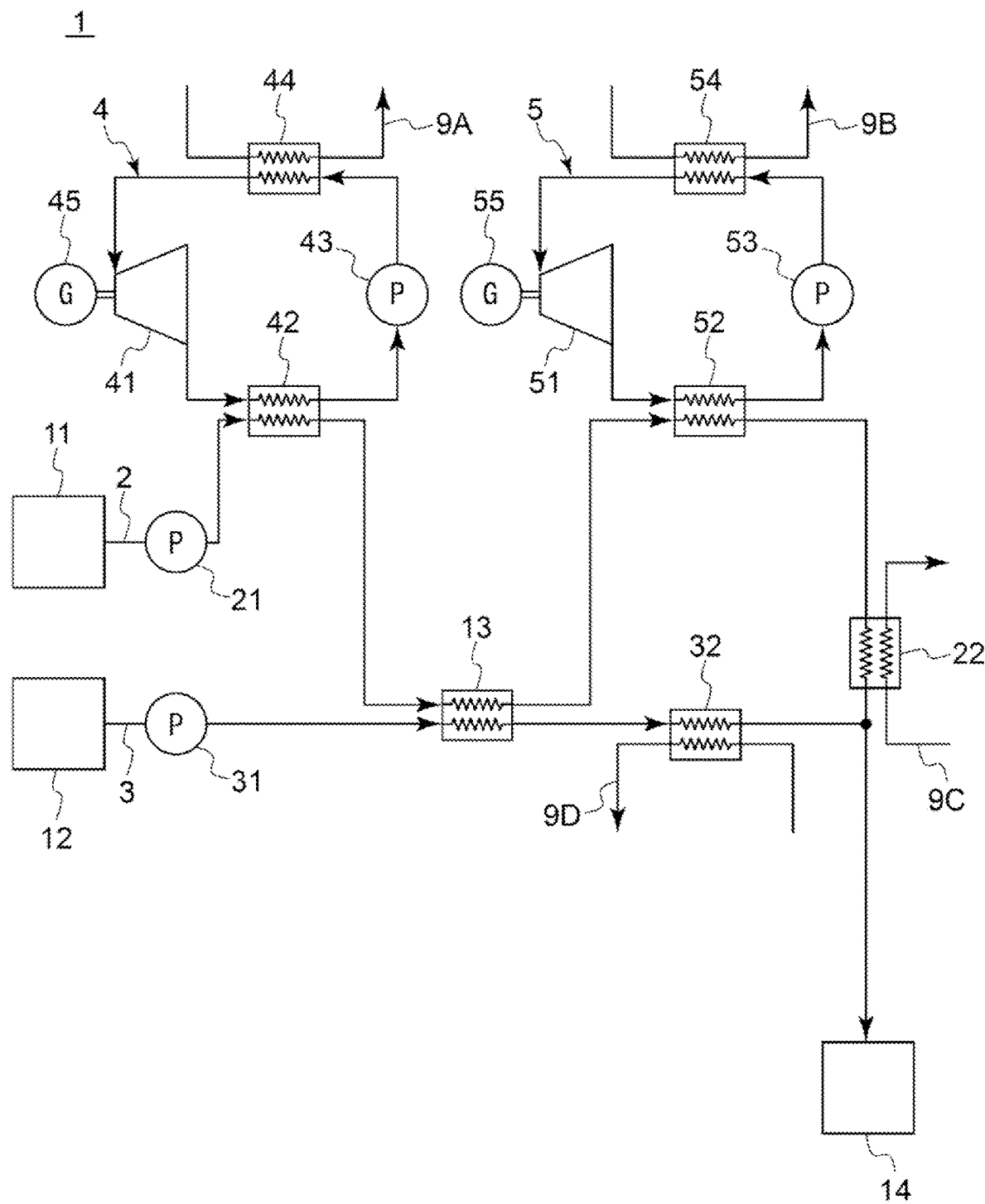
FIG. 1 is a schematic diagram of a cold heat recovery system according to one embodiment.

Some embodiments of the disclosure will be described below with reference to the accompanying drawings. However, dimensions, materials, shapes, relative arrangements or the like of components described in the embodiments or illustrated in the drawings are not intended to limit the scope of the disclosure but are merely explanatory examples.

Fuel Tank and Fuel Supply Line

Each of FIGS. 1 to 7 is a schematic diagram of a cold heat recovery system according to one embodiment. As illustrated in FIGS. 1 to 7, a cold heat recovery system 1 according to some embodiments includes a first fuel tank 11 configured to store a first fuel in a liquid state, a second fuel tank 12 configured to store a second fuel in a liquid state, a first fuel supply line 2 for sending the first fuel extracted from the first fuel tank 11, and a second fuel supply line 3 for sending the second fuel extracted from the second fuel tank 12. Hereinafter, an upstream side in a fluid flow direction is simply referred to as "upstream side", and a downstream side in the fluid flow direction is simply referred to as "downstream side".

A liquefaction temperature (or boiling point) of the second fuel is lower than a liquefaction temperature (or boiling point) of the first fuel. In other words, the liquefaction temperature of the first fuel is higher than the liquefaction temperature of the second fuel. A temperature of the second fuel in the liquid state stored in the second fuel tank 12 is lower than a temperature of the first fuel in the liquid state stored in the first fuel tank 11.

In some embodiments, the first fuel is natural gas (liquefaction temperature: about −163° C.), and the second fuel is hydrogen (liquefaction temperature: about −253° C.). In this case, liquefied natural gas (LNG) at about −163° C. is stored in the first fuel tank 11, and liquefied hydrogen (LH2) at about −253° C. is stored in the second fuel tank 12.

The first fuel supply line 2 is formed of a first fuel supply system for sending the first fuel from the first fuel tank 11 to a supply destination (in the illustrated example, a combustion device 14) of the first fuel. One side (upstream end) of the first fuel supply line 2 is connected to the first fuel tank 11, and the other side (downstream end) of the first fuel supply line 2 is connected to the supply destination of the first fuel. The first fuel supply line 2 includes a first fuel pump 21 for pumping liquid first fuel provided on the first fuel supply line 2. The liquid first fuel stored in the first fuel tank 11 is extracted to the first fuel supply line 2 by the first fuel pump 21, and the first fuel is sent to the downstream side of the first fuel supply line 2.

The second fuel supply line 3 is formed of a second fuel supply system for sending the second fuel from the second fuel tank 12 to a supply destination (in the illustrated example, the combustion device 14) of the second fuel. One side (upstream end) of the second fuel supply line 3 is connected to the second fuel tank 12, and the other side (downstream end) of the second fuel supply line 3 is connected to the supply destination of the second fuel. The second fuel supply line 3 includes a second fuel pump 31 for pumping liquid second fuel provided on the second fuel supply line 3. The liquid second fuel stored in the second fuel tank 12 is extracted to the second fuel supply line 3 by the second fuel pump 31, and the second fuel is sent to the downstream side of the second fuel supply line 3.

As illustrated in FIGS. 1 to 7, the cold heat recovery system 1 further includes a first cold heat recovery cycle 4, a second cold heat recovery cycle 5, a first heat exchanger 42 provided on the first fuel supply line 2, a second heat exchanger 13 provided on a downstream side of the first heat exchanger 42 on the first fuel supply line 2, and a third heat exchanger 52 provided on a downstream side of the second heat exchanger 13 on the first fuel supply line 2.

In the cold heat recovery system 1, the first fuel in a liquid state from the first fuel tank 11 is vaporized by heat exchange in the first heat exchanger 42. The first fuel in a gas state from the first heat exchanger 42 is liquefied by heat exchange in the second heat exchanger 13. The first fuel in a liquid state from the second heat exchanger 13 is vaporized by heat exchange in the third heat exchanger 52. The second fuel in a liquid state from the second fuel tank 12 is vaporized by a heat exchanger provided on the second fuel supply line 3 such as the second heat exchanger 13. The first fuel and the second fuel vaporized into a gas state are heated to an appropriate temperature by a heater or the like as necessary, and then supplied as fuel to a supply destination (in the illustrated example, the combustion device 14) via the first fuel supply line 2 and the second fuel supply line 3.

First Cold Heat Recovery Cycle

The first cold heat recovery cycle 4 is formed of a circulation system configured to circulate the first heat medium. As illustrated in FIGS. 1 to 7, the first cold heat recovery cycle 4 includes a first expansion turbine 41, a first pump 43, and a first evaporator 44 that are provided on the first cold heat recovery cycle 4. The first cold heat recovery cycle 4 constitutes a heat exchange cycle (organic Rankine cycle) using the first heat medium as a working medium together with the first heat exchanger 42 provided on the first cold heat recovery cycle 4.

The first pump 43 is provided on a downstream side of the first heat exchanger 42 on the first cold heat recovery cycle 4. The first pump 43 is configured to boost pressure of the liquid first heat medium condensed in the first heat exchanger 42. Driving the first pump 43 causes the first heat medium to circulate on the first cold heat recovery cycle 4.

The first evaporator 44 is provided on a downstream side of the first pump 43 on the first cold heat recovery cycle 4. The liquid first heat medium boosted by the first pump 43 flows into the first evaporator 44. The first evaporator 44 is configured to evaporate the first heat medium by performing heat exchange between the heat medium (for example, seawater) flowing through a heat medium supply line 9A and the first heat medium flowing through the first cold heat recovery cycle 4. The first heat medium brought into a gas state by the first evaporator 44 is guided to the first expansion turbine 41.

The first expansion turbine 41 is provided on a downstream side of the first evaporator 44 and an upstream side of the first heat exchanger 42 on the first cold heat recovery cycle 4 and is configured to expand the first heat medium in a gas state. The first expansion turbine 41 is configured to expand the first heat medium in a gas state to recover the rotational power of the turbine from the first heat medium. As illustrated in FIGS. 1 to 7, the first cold heat recovery cycle 4 may further include a first generator 45 connected to the first expansion turbine 41. The first generator 45 is configured to be rotationally driven by the rotational power recovered by the first expansion turbine 41 to generate electric power.

The first cold heat recovery cycle 4 allows the first expansion turbine 41 to output power by cold energy recovered from the first fuel in the first heat exchanger 42. When the first cold heat recovery cycle 4 includes the first generator 45, the power output from the first expansion turbine 41 can be converted into electric power.

First Heat Exchanger

The first heat exchanger 42 is provided on a downstream side of the first fuel pump 21 on the first fuel supply line 2. The first heat exchanger 42 is provided on a downstream side of the first expansion turbine 41 and an upstream side of the first pump 43 on the first cold heat recovery cycle 4. The first heat exchanger 42 is configured to function as an evaporator for evaporating the first fuel on the first fuel supply line 2 and to function as a condenser for condensing the first heat medium on the first cold heat recovery cycle 4.

The first heat exchanger 42 is configured to transfer cold energy from the first fuel flowing through the first fuel supply line 2 to the first heat medium flowing through the first cold heat recovery cycle 4. The first heat exchanger 42 includes a first fuel side flow path provided on the first fuel supply line 2 and through which the first fuel flows, and a first heat medium side flow path provided on the first cold heat recovery cycle 4 and through which the first heat medium having a temperature higher than that of the first fuel flowing through the first fuel side flow path flows. The first heat exchanger 42 is configured to allow heat exchange between the first fuel side flow path of the first heat exchanger 42 and the first heat medium side flow path of the first heat exchanger 42.

In the first heat exchanger 42, the first fuel flowing through the first fuel side flow path is heated and evaporated by the first heat medium flowing through the first heat medium side flow path. In the first heat exchanger 42, the first heat medium flowing through the first heat medium side flow path is cooled and condensed by the first fuel flowing through the first fuel side flow path. The first fuel from the first fuel tank 11 flows into the first heat exchanger 42 in a liquid state.

Second Cold Heat Recovery Cycle

The second cold heat recovery cycle 5 is formed of a circulation system configured to circulate the second heat medium. As illustrated in FIGS. 1 to 7, the second cold heat recovery cycle 5 includes a second expansion turbine 51, a second pump 53, and a second evaporator 54 that are provided on the second cold heat recovery cycle 5. The second cold heat recovery cycle 5 constitutes a heat exchange cycle (organic Rankine cycle) using the second heat medium as a working medium together with the third heat exchanger 52 provided on the second cold heat recovery cycle 5.

The second pump 53 is provided on a downstream side of the third heat exchanger 52 on the second cold heat recovery cycle 5. The second pump 53 is configured to boost pressure of the liquid second heat medium condensed in the third heat exchanger 52. Driving the second pump 53 causes the second heat medium to circulate on the second cold heat recovery cycle 5.

The second evaporator 54 is provided on a downstream side of the second pump 53 on the second cold heat recovery cycle 5. The liquid second heat medium boosted by the second pump 53 flows into the second evaporator 54. The second evaporator 54 is configured to evaporate the second heat medium by performing heat exchange between the heat medium (for example, seawater) flowing through a heat medium supply line 9B and the second heat medium flowing through the second cold heat recovery cycle 5. The second heat medium brought into a gas state by the second evaporator 54 is guided to the second expansion turbine 51.

The second expansion turbine 51 is provided on a downstream side of the second evaporator 54 and an upstream side of the third heat exchanger 52 on the second cold heat recovery cycle 5 and is configured to expand the second heat medium in a gas state. The second expansion turbine 51 is configured to expand the second heat medium in a gas state to recover the rotational power of the turbine from the second heat medium. As illustrated in FIGS. 1 to 7, the second cold heat recovery cycle 5 may further include a second generator 55 connected to the second expansion turbine 51. The second generator 55 is configured to be rotationally driven by the rotational power recovered by the second expansion turbine 51 to generate electric power.

The second cold heat recovery cycle 5 allows the second expansion turbine 51 to output power by cold energy recovered from the first fuel in the third heat exchanger 52. When the second cold heat recovery cycle 5 includes the second generator 55, the power output from the second expansion turbine 51 can be converted into electric power.

Third Heat Exchanger

The third heat exchanger 52 is provided on a downstream side of the second heat exchanger 13 on the first fuel supply line 2. The third heat exchanger 52 is provided on a downstream side of the second expansion turbine 51 and an upstream side of the second pump 53 on the second cold heat recovery cycle 5. The third heat exchanger 52 is configured to function as an evaporator for evaporating the first fuel on the first fuel supply line 2 and to function as a condenser for condensing the second heat medium on the second cold heat recovery cycle 5.

The third heat exchanger 52 is configured to transfer cold energy from the first fuel flowing through the first fuel supply line 2 to the second heat medium flowing through the second cold heat recovery cycle 5. The third heat exchanger 52 includes the first fuel side flow path provided on the first fuel supply line 2 and through which the first fuel flows, and a second heat medium side flow path provided on the second cold heat recovery cycle 5 and through which the second heat medium having a temperature higher than that of the first fuel flowing through the first fuel side flow path flows. The third heat exchanger 52 is configured to allow heat exchange between the first fuel side flow path of the third heat exchanger 52 and the second heat medium side flow path of the third heat exchanger 52.

In the third heat exchanger 52, the first fuel flowing through the first fuel side flow path is heated and evaporated by the second heat medium flowing through the second heat medium side flow path. In the third heat exchanger 52, the second heat medium flowing through the second heat medium side flow path is cooled and condensed by the first fuel flowing through the first fuel side flow path. The first fuel from the second heat exchanger 13 flows into the third heat exchanger 52 in a liquid state.

Second Heat Exchanger

The second heat exchanger 13 is provided on a downstream side of the first heat exchanger 42 and an upstream side of the third heat exchanger 52 on the first fuel supply line 2. The second heat exchanger 13 is provided on a downstream side of the second fuel pump 31 on the second fuel supply line 3. The second heat exchanger 13 is configured to function as a condenser for condensing the first fuel on the first fuel supply line 2 and to function as a heater for heating the second fuel on the second fuel supply line 3. The first fuel is reliquefied by the second heat exchanger 13.

The second heat exchanger 13 is configured to transfer cold energy from the second fuel flowing through the second fuel supply line 3 to the first fuel flowing through the first fuel supply line 2. The second heat exchanger 13 includes the first fuel side flow path provided on the first fuel supply line 2 and through which the first fuel flows, and a second fuel side flow path provided on the first fuel supply line 2 and through which the second fuel having a temperature lower than that of the first fuel flowing through the first fuel side flow path flows. The second heat exchanger 13 is configured to allow heat exchange between the first fuel side flow path of the second heat exchanger 13 and the second fuel side flow path of the second heat exchanger 13.

In the second heat exchanger 13, the first fuel flowing through the first fuel side flow path is cooled and condensed by the second fuel flowing through the second fuel side flow path, and the second fuel flowing through the second fuel side flow path is heated by the first fuel flowing through the first fuel side flow path.

In the embodiment illustrated in FIGS. 1 to 4, the second fuel from the second fuel tank 12 flows into the second heat exchanger 13 in a liquid state. The second heat exchanger 13 is configured to function as an evaporator for evaporating the second fuel on the second fuel supply line 3. In the embodiment illustrated in FIGS. 5 to 7, the second fuel from the second fuel tank 12 flows into the second heat exchanger 13 in a gas state.

As illustrated in FIGS. 1 to 7, the cold heat recovery system 1 according to some embodiments includes the first fuel tank 11, the second fuel tank 12, the first fuel supply line 2, the second fuel supply line 3, the first cold heat recovery cycle 4 including the first expansion turbine 41, the first heat exchanger 42, the second heat exchanger 13, the second cold heat recovery cycle 5 including the second expansion turbine 51, and the third heat exchanger 52.

According to the configuration described above, reliquefying the first fuel allows the two cold heat recovery cycles 4 and 5 using the latent heat of the first fuel to be driven. Specifically, in the first heat exchanger 42, transferring the cold energy of the first fuel to the first heat medium allows the cold energy of the first fuel to be used as a cold source of the first cold heat recovery cycle 4. In the second heat exchanger 13, transferring cold energy of the second fuel to the first fuel allows the first fuel vaporized by heat exchange in the first heat exchanger 42 to be reliquefied. In the third heat exchanger 52, transferring the cold energy of the reliquefied first fuel to the second heat medium allows the cold energy of the first fuel to be used as a cold source of the second cold heat recovery cycle 5. Therefore, according to the configuration described above, reliquefying the first fuel enables cold heat recovery also in the second expansion turbine 51, allowing the output of the turbine of the cold heat recovery system 1 to be increased as a whole as compared with a case where the first fuel is not reliquefied.

According to the configuration described above, the first fuel and the second fuel in a liquid state are vaporized by heat exchange with another medium in the heat exchanger (the second heat exchanger 13, the third heat exchanger 52, and the like) included in the cold heat recovery system 1. That is, the cold heat recovery system 1 can efficiently vaporize the liquid fuel of both the first fuel and the second fuel. Thus, according to the configuration described above, the cold energy of the liquid fuel can be recovered while the two types of liquid fuel are efficiently vaporized.

Combustion Device

In some embodiments, as illustrated in FIGS. 1 to 7, the cold heat recovery system 1 described above further includes a combustion device (for example, a gas turbine) 14 configured to combust the first fuel and the second fuel. The combustion device 14 is connected to a downstream end of the first fuel supply line 2 provided on a downstream side of the third heat exchanger 52 on the first fuel supply line 2 and is connected to a downstream end of the second fuel supply line 3 provided on a downstream side of the second heat exchanger 13 on the second fuel supply line 3.

In the embodiment illustrated in FIGS. 1 to 7, the first fuel supply line 2 and the second fuel supply line 3 merge on a downstream side of the third heat exchanger 52 on the first fuel supply line 2 and on a downstream side of the second heat exchanger 13 on the second fuel supply line 3. A mixed fuel in which the first fuel (for example, natural gas) in a gas state and the second fuel (for example, hydrogen) in a gas state are mixed is supplied to the combustion device 14. In some other embodiments, the cold heat recovery system 1 may be configured such that the supply destination of the first fuel in a gas state is different from the supply destination of the second fuel in a gas state.

According to the configuration described above, the first fuel guided to the combustion device 14 is vaporized by cold energy being recovered in the heat exchanger (such as the third heat exchanger 52) provided on the first fuel supply line 2. The second fuel guided to the combustion device 14 is vaporized by cold energy being recovered in the heat exchanger (such as the second heat exchanger 13) provided on the second fuel supply line 3. The cold heat recovery system 1 can recover, as output of the turbine, the cold energy of the first fuel and the second fuel. The cold heat recovery system 1 can use the vaporized first fuel and second fuel as fuel in the combustion device 14. This can suppress the first fuel and the second fuel from being supplied to the combustion device 14 without being sufficiently vaporized and thus can suppress failure and malfunction of the combustion device 14.

First Fuel Side Heater

As illustrated in FIGS. 1 to 7, the cold heat recovery system 1 described above may further include a first fuel side heater 22 for heating the first fuel provided on the first fuel supply line 2. The first fuel side heater 22 is provided on a downstream side of the third heat exchanger 52 on the first fuel supply line 2 and an upstream side of the merging portion with the second fuel supply line 3. The first fuel in a gas state is heated to an appropriate temperature by the first fuel side heater 22 and then supplied to the supply destination of the first fuel. The first fuel side heater 22 may be configured to heat the first fuel by exchanging heat between the heat medium (for example, seawater) flowing through a heat medium supply line 9C and the first fuel flowing through the first fuel supply line 2.

Second Fuel Side Heater

As illustrated in FIGS. 1 to 7, the cold heat recovery system 1 described above may further include a second fuel side heater 32 for heating the second fuel provided on the second fuel supply line 3. The second fuel side heater 32 is provided on a downstream side of the second heat exchanger 13 on the second fuel supply line 3 and an upstream side of the merging portion with the first fuel supply line 2. The second fuel in a gas state is heated to an appropriate temperature by the second fuel side heater 32 and then supplied to the supply destination of the second fuel. The second fuel side heater 32 may be configured to heat the second fuel by exchanging heat between the heat medium (for example, seawater) flowing through a heat medium supply line 9D and the second fuel flowing through the second fuel supply line 3.

Figure 2:
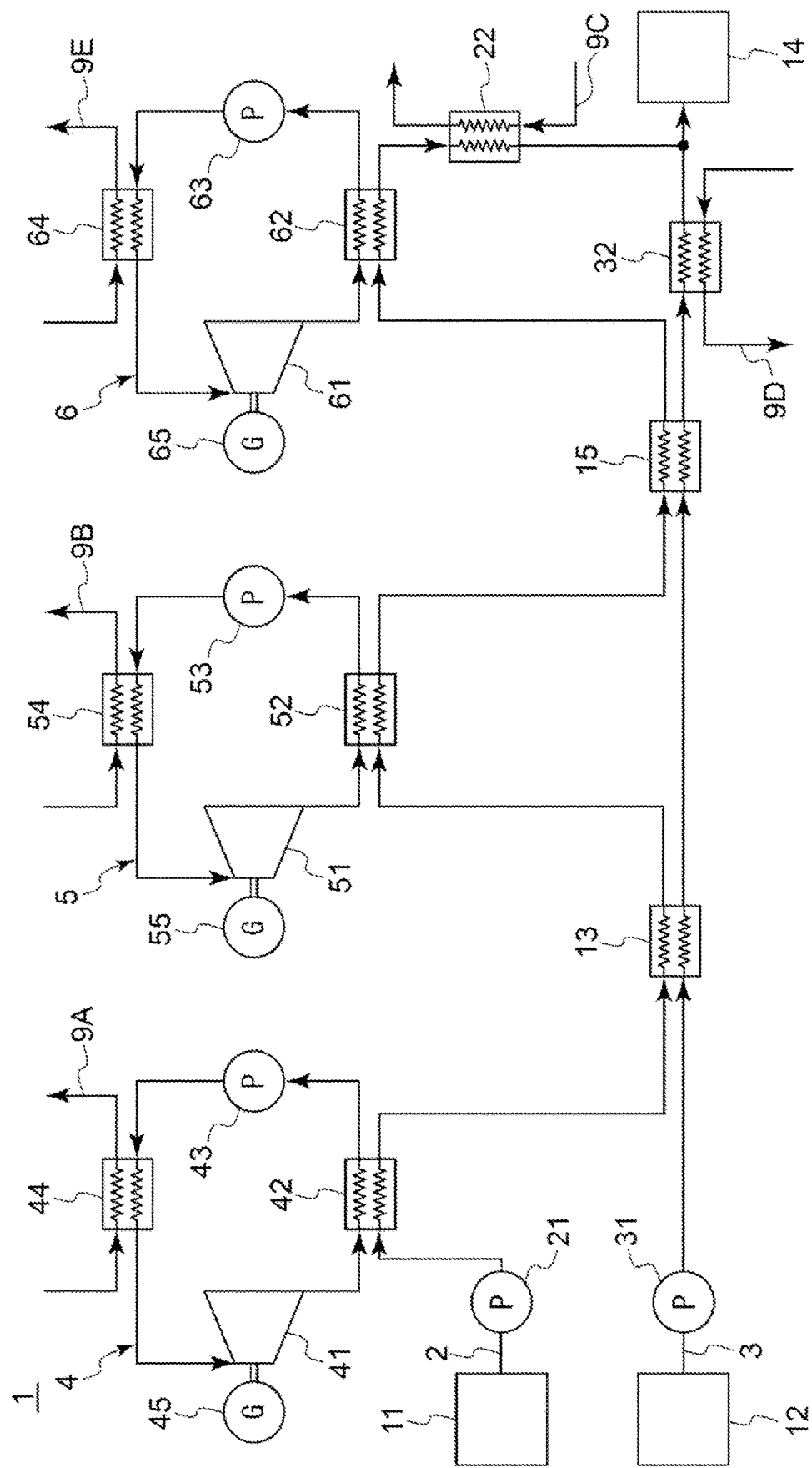
FIG. 2 is a schematic diagram of a cold heat recovery system according to one embodiment.
Figure 3:
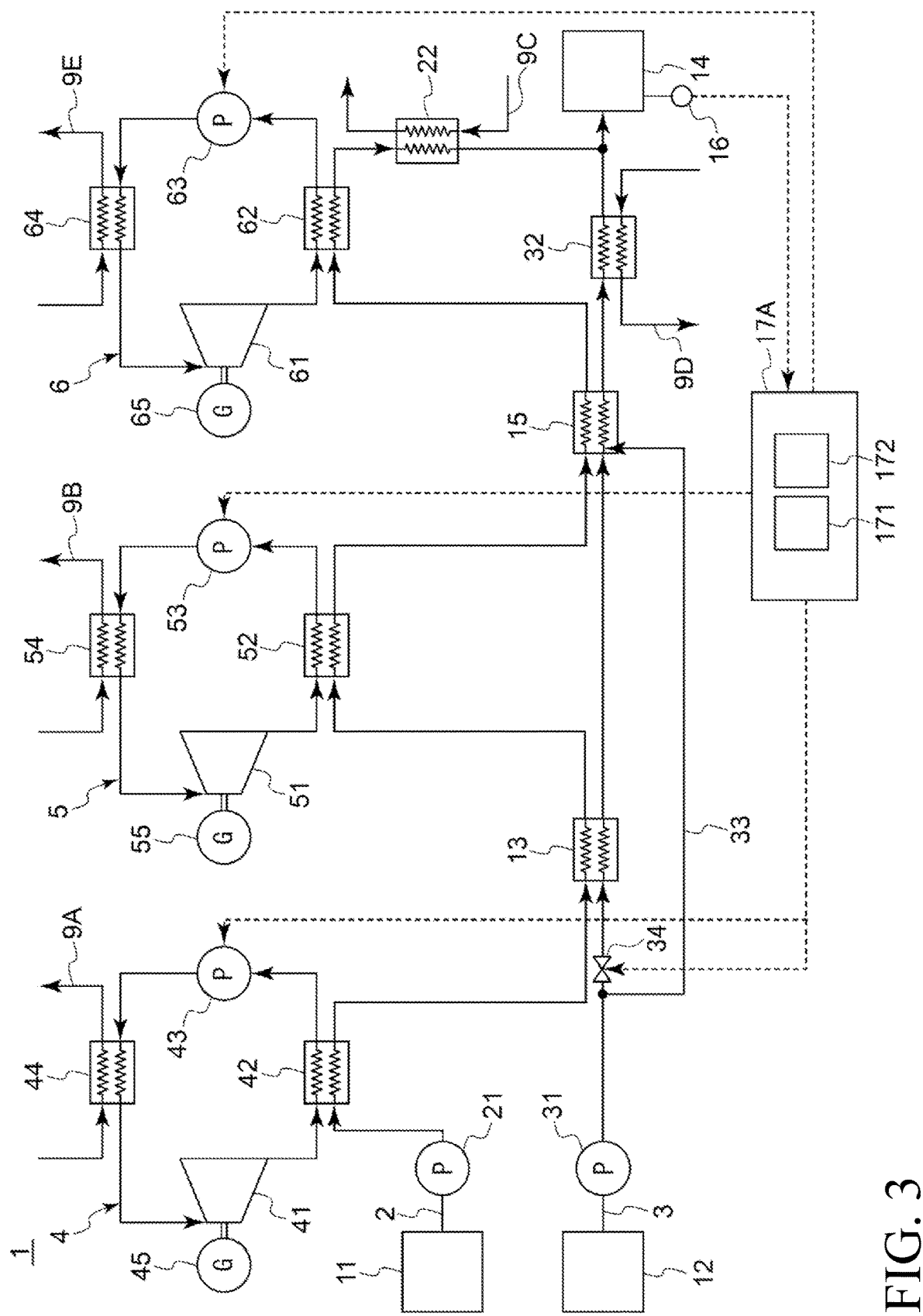
FIG. 3 is a schematic diagram of a cold heat recovery system according to one embodiment.
Figure 4:
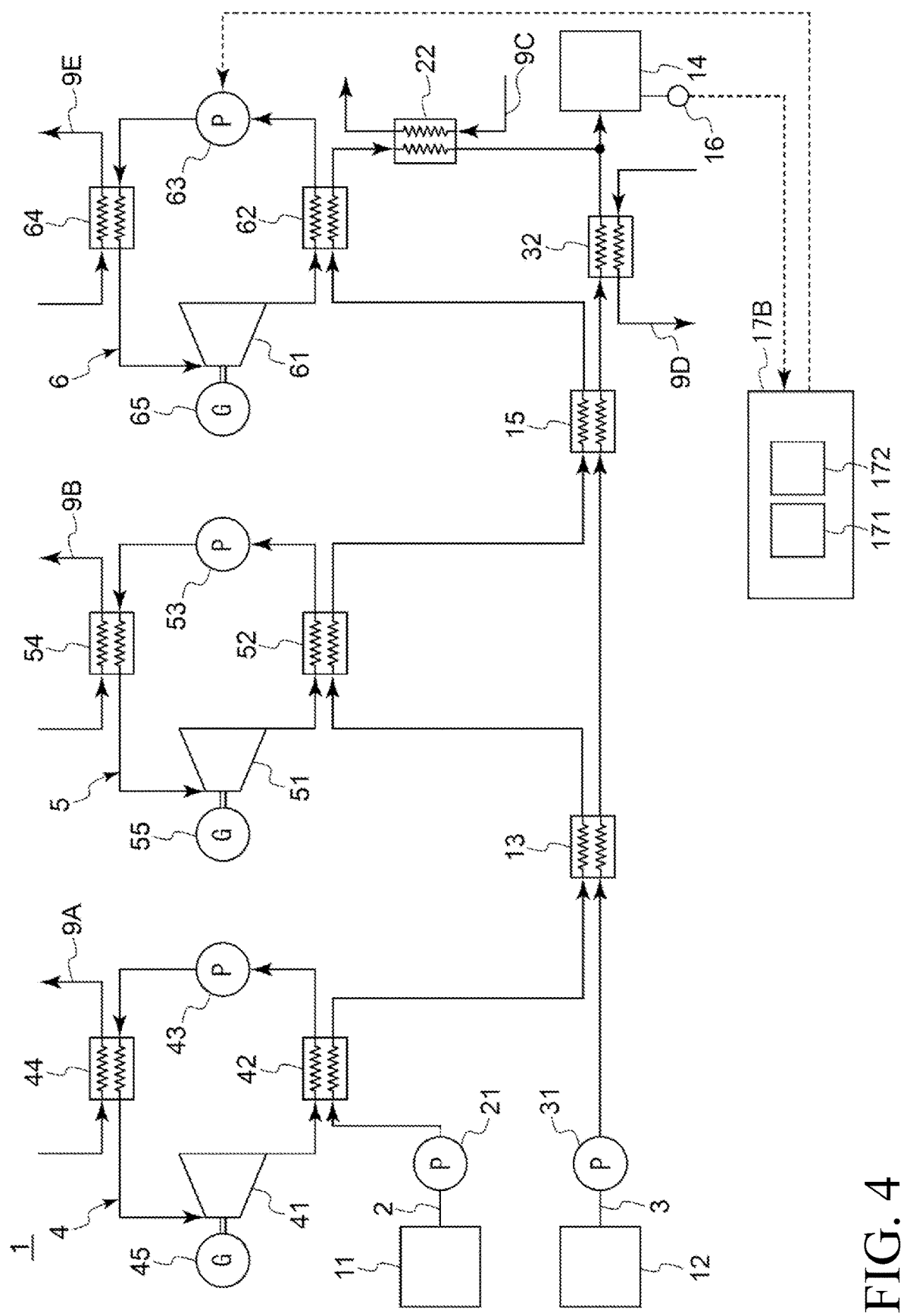
FIG. 4 is a schematic diagram of a cold heat recovery system according to one embodiment.

In some embodiments, as illustrated in FIGS. 2 to 4, the cold heat recovery system 1 described above further includes a third cold heat recovery cycle 6, a fourth heat exchanger 15 provided on a downstream side of the third heat exchanger 52 on the first fuel supply line 2, and a fifth heat exchanger 62 provided on a downstream side of the fourth heat exchanger 15 on the first fuel supply line 2. The fifth heat exchanger 62 is provided on an upstream side of the first fuel side heater 22 on the first fuel supply line 2.

In the cold heat recovery system 1 in the present embodiment, the first fuel in a gas state from the third heat exchanger 52 is liquefied by heat exchange in the fourth heat exchanger 15. The heat exchange in the fifth heat exchanger 62 vaporizes the first fuel in a liquid state from the fourth heat exchanger 15.

Third Cold Heat Recovery Cycle

The third cold heat recovery cycle 6 is formed of a circulation system configured to circulate the third heat medium (for example, seawater). As illustrated in FIGS. 2 to 4, the third cold heat recovery cycle 6 includes a third expansion turbine 61, a third pump 63, and a third evaporator 64 that are provided on the third cold heat recovery cycle 6. The third cold heat recovery cycle 6 constitutes a heat exchange cycle (organic Rankine cycle) using the third heat medium as a working medium together with the fifth heat exchanger 62 provided on the third cold heat recovery cycle 6.

The third pump 63 is provided on a downstream side of the fifth heat exchanger 62 on the third cold heat recovery cycle 6. The third pump 63 is configured to boost pressure of the liquid third heat medium condensed in the fifth heat exchanger 62. Driving the third pump 63 causes the third heat medium to circulate on the third cold heat recovery cycle 6.

The third evaporator 64 is provided on a downstream side of the third pump 63 on the third cold heat recovery cycle 6. The liquid third heat medium boosted by the third pump 63 flows into the third evaporator 64. The third evaporator 64 is configured to evaporate the third heat medium by performing heat exchange between the heat medium (for example, seawater) flowing through a heat medium supply line 9E and the third heat medium flowing through the third cold heat recovery cycle 6. The third heat medium brought into a gas state by the third evaporator 64 is guided to the third expansion turbine 61.

The third expansion turbine 61 is provided on a downstream side of the third evaporator 64 and an upstream side of the fifth heat exchanger 62 on the third cold heat recovery cycle 6 and is configured to expand the third heat medium in a gas state. The third expansion turbine 61 is configured to expand the third heat medium in a gas state to recover the rotational power of the turbine from the third heat medium. As illustrated in FIGS. 2 to 4, the third cold heat recovery cycle 6 may further include a third generator 65 connected to the third expansion turbine 61. The third generator 65 is configured to be rotationally driven by the rotational power recovered by the third expansion turbine 61 to generate electric power.

The third cold heat recovery cycle 6 allows the third expansion turbine 61 to output power by cold energy recovered from the first fuel in the fifth heat exchanger 62. When the third cold heat recovery cycle 6 includes the third generator 65, the power output from the third expansion turbine 61 can be converted into electric power.

Fifth Heat Exchanger

The fifth heat exchanger 62 is provided on a downstream side of the fourth heat exchanger 15 on the first fuel supply line 2. The fifth heat exchanger 62 is provided on a downstream side of the third expansion turbine 61 and an upstream side of the third pump 63 on the third cold heat recovery cycle 6. The fifth heat exchanger 62 is configured to function as an evaporator for evaporating the first fuel on the first fuel supply line 2 and to function as a condenser for condensing the third heat medium on the third cold heat recovery cycle 6.

The fifth heat exchanger 62 is configured to transfer cold energy from the first fuel flowing through the first fuel supply line 2 to the third heat medium flowing through the third cold heat recovery cycle 6. The fifth heat exchanger 62 includes the first fuel side flow path provided on the first fuel supply line 2 and through which the first fuel flows, and a third heat medium side flow path provided on the third cold heat recovery cycle 6 and through which the third heat medium having a temperature higher than that of the first fuel flowing through the first fuel side flow path flows. The fifth heat exchanger 62 is configured to allow heat exchange between the first fuel side flow path of the fifth heat exchanger 62 and the third heat medium side flow path of the fifth heat exchanger 62.

In the fifth heat exchanger 62, the first fuel flowing through the first fuel side flow path is heated and evaporated by the third heat medium flowing through the third heat medium side flow path. In the fifth heat exchanger 62, the third heat medium flowing through the third heat medium side flow path is cooled and condensed by the first fuel flowing through the first fuel side flow path. The first fuel from the fourth heat exchanger 15 flows into the fifth heat exchanger 62 in a liquid state.

Fourth Heat Exchanger

The fourth heat exchanger 15 is provided on a downstream side of the third heat exchanger 52 and an upstream side of the fifth heat exchanger 62 on the first fuel supply line 2. The fourth heat exchanger 15 is provided on a downstream side of the second heat exchanger 13 on the second fuel supply line 3. The fourth heat exchanger 15 is configured to function as a condenser for condensing the first fuel on the first fuel supply line 2 and to function as a heater for heating the second fuel on the second fuel supply line 3. The first fuel is reliquefied by the fourth heat exchanger 15. The fourth heat exchanger is provided on an upstream side of the second fuel side heater 32 on the second fuel supply line 3.

The fourth heat exchanger 15 is configured to transfer cold energy from the second fuel flowing through the second fuel supply line 3 to the first fuel flowing through the first fuel supply line 2. The fourth heat exchanger 15 includes the first fuel side flow path provided on the first fuel supply line 2 and through which the first fuel flows, and a second fuel side flow path provided on the second fuel supply line 3 and through which the second fuel having a temperature lower than that of the first fuel flowing through the first fuel side flow path flows. The fourth heat exchanger 15 is configured to allow heat exchange between the first fuel side flow path of the fourth heat exchanger 15 and the second fuel side flow path of the fourth heat exchanger 15.

In the fourth heat exchanger 15, the first fuel flowing through the first fuel side flow path is cooled and condensed by the second fuel flowing through the second fuel side flow path. In the fourth heat exchanger 15, the second fuel flowing through the second fuel side flow path is heated by the first fuel flowing through the first fuel side flow path. The second fuel from the second heat exchanger 13 flows into the fourth heat exchanger 15 in a gas state.

According to the configuration described above, when the second fuel stored in the second fuel tank 12 has sufficient cold energy, the reliquefaction of the first fuel can be performed twice. This can drive the three cold heat recovery cycles 4, 5, and 6 using the latent heat of the first fuel. Specifically, in the fourth heat exchanger 15, transferring cold energy of the second fuel to the first fuel allows the first fuel vaporized by heat exchange in the third heat exchanger 52 to be reliquefied. In the fourth heat exchanger 15, transferring the cold energy of the reliquefied first fuel to the third heat medium allows the cold energy of the first fuel to be used as a cold source of the third cold heat recovery cycle 6. Therefore, according to the configuration described above, reliquefying the first fuel twice enables cold heat recovery also in the third expansion turbine 61, allowing the output of the turbine of the cold heat recovery system 1 to be increased as a whole as compared with a case where the first fuel is reliquefied once.

First Bypass Line and Flow Control Valve

In some embodiments, as illustrated in FIG. 3, the cold heat recovery system 1 described above further includes a first bypass line 33 and a flow control valve 34. The first bypass line 33 is configured to bypass the second heat exchanger 13 and guide the second fuel to the fourth heat exchanger 15 from an upstream side of the second heat exchanger 13 on the second fuel supply line 3. The first bypass line 33 has one end (upstream end) connected to a downstream side of the second fuel pump 31 and an upstream side of the second heat exchanger 13 on the second fuel supply line 3. The first bypass line 33 may have the other end (downstream end) connected to the fourth heat exchanger 15 provided on the second fuel supply line 3 or connected to a downstream side of the second heat exchanger 13 on the second fuel supply line 3 and an upstream side of the fourth heat exchanger 15.

The flow control valve 34 is provided between the connection position at the upstream end of the first bypass line 33 on the second fuel supply line 3 and the second heat exchanger 13 and configured to regulate the flow rate of the second fuel passing through the flow control valve 34. In an embodiment, the flow control valve 34 is configured to regulate an opening degree to fully closed, fully opened, or at least one intermediate opening degree between fully closed and fully opened. Reducing the opening degree of the flow control valve 34 can increase the amount of the second fuel flowing through the first bypass line 33 as compared with a case where the opening degree of the flow control valve 34 is large. Increasing the opening degree of the flow control valve 34 can increase the amount of the second fuel passing through the flow control valve 34 and guided to the second heat exchanger 13 as compared with a case where the opening degree of the flow control valve 34 is small.

According to the configuration described above, reducing the opening degree of the flow control valve 34 can guide at least a part of the second fuel to the fourth heat exchanger 15 through the first bypass line 33. Since the second fuel guided to the fourth heat exchanger 15 through the first bypass line 33 has unrecovered cold energy in the second heat exchanger 13, the degree of subcooling of the first fuel having passed through the fourth heat exchanger 15 can be increased. Increasing the degree of subcooling of the first fuel having passed through the fourth heat exchanger 15 can increase a cold heat recovery amount by the third expansion turbine 61 using, as a cold source, the cold energy of the first fuel having passed through the fourth heat exchanger 15, as compared with a case where the first bypass line 33 is not provided.

Problem when Mixing Rate of Hydrogen in Mixed Fuel is Low

The higher the mixing rate of hydrogen (second fuel) in the mixed fuel supplied to the combustion device 14 is, the more the emission rate of nitrogen oxides in the combustion device 14 increases, and thus the mixing rate of hydrogen (second fuel) in the mixed fuel may be limited to be able to comply with nitrogen oxide emission regulations. For example, in a case where a marine vessel 10A or a floating body 10B on which the cold heat recovery system 1 is equipped and driven navigates a sea area where the nitrogen oxide emission regulations is strict, it is necessary to intentionally lower the mixing rate of hydrogen (second fuel) in the mixed fuel. In a case where the mixing rate of hydrogen (second fuel) in the mixed fuel is low, the first fuel cannot be sufficiently cooled by the cold energy of the second fuel, and the degree of subcooling of the first fuel that having passed through the fourth heat exchanger 15 may decrease.

Control of Cold Heat Recovery System by Control Device Illustrated in FIG. 3

In some embodiments, as illustrated in FIG. 3, the cold heat recovery system 1 described above further includes a mixing rate acquisition device 16 configured to acquire mixing rates of the first fuel and the second fuel guided to the combustion device 14 described above and a control device 17A configured to stop driving of either the first cold heat recovery cycle 4 or the second cold heat recovery cycle 5 when the mixing rate of the second fuel acquired by the mixing rate acquisition device 16 is equal to or less than a predetermined value. The second fuel in the present embodiment includes hydrogen.

The mixing rate acquisition device 16 may be a gas concentration meter attached to the combustion device 14 and capable of measuring the concentration of each of the first fuel and the second fuel contained in the mixed fuel supplied to the combustion device 14, as illustrated in FIG. 3.

As illustrated in FIG. 3, the control device 17A includes a mixing rate determination unit 171 that determines whether or not the mixing rate of the second fuel (hydrogen) acquired by the mixing rate acquisition device 16 is equal to or less than a predetermined value, and a drive control unit 172 that stops driving of either the first cold heat recovery cycle 4 or the second cold heat recovery cycle 5 when the mixing rate determination unit 171 determines that the mixing rate of the second fuel (hydrogen) is equal to or less than the predetermined value. The drive control unit 172 can stop driving of the first cold heat recovery cycle 4 by instructing the first pump 43 to stop and stopping driving of the first pump 43. The drive control unit 172 can stop driving of the second cold heat recovery cycle 5 by instructing the second pump 53 to stop and stopping driving of the second pump 53. The drive control unit 172 may instruct the flow control valve 34 to fully close the opening degree when stopping driving of the first cold heat recovery cycle 4 or the second cold heat recovery cycle 5. Fully closing the opening degree of the flow control valve 34 to stop supply of the second fuel to the second heat exchanger 13 eliminates heat exchange between the first fuel and the second fuel in the second heat exchanger 13.

When the mixing rate determination unit 171 determines that the mixing rate of the second fuel (hydrogen) is equal to or less than the predetermined value, the drive control unit 172 of the control device 17A may stop driving of the third cold heat recovery cycle 6 instead of stopping driving of either the first cold heat recovery cycle 4 or the second cold heat recovery cycle 5. In this case, the drive control unit 172 stops driving of the third cold heat recovery cycle 6 by instructing the third pump 63 to stop and stopping driving of the third pump 63.

The control device 17A is an electronic control unit for controlling equipment included in the cold heat recovery system 1. The control device 17A is configured as a microcomputer including a processor (CPU) not illustrated, a memory such as a ROM and a RAM, a storage device such as an external storage device, an I/O interface, and a communication interface. The control device 17A may achieve control in each of the above-described units 171 and 172 of the control device 17A by the CPU operating (for example, calculation of data) according to a command of a program loaded to a main storage device of the memory, for example.

According to the configuration described above, stopping driving of either the first cold heat recovery cycle 4 or the second cold heat recovery cycle 5 when the mixing rate of the second fuel acquired by the mixing rate acquisition device 16 is equal to or less than the predetermined value allows the control device 17A to increase the degree of subcooling of the first fuel having passed through the fourth heat exchanger 15 even when the mixing rate of hydrogen (second fuel) in the mixed fuel is low. The cold heat recovery system 1 can be stably operated even when the mixing rate of hydrogen (second fuel) in the mixed fuel is low.

According to the configuration described above, regulating the opening degree of the flow control valve 34 allows the cold heat recovery system 1 to regulate the degree of subcooling of the first fuel having passed through the fourth heat exchanger 15 without regulating the pressure in the third cold heat recovery cycle 6. Therefore, the cold heat recovery system 1 including the first bypass line 33 and the flow control valve 34 can suppress complication of the operation control of the third cold heat recovery cycle 6.

Control of Cold Heat Recovery System by Control Device Illustrated in FIG. 4

In some embodiments, as illustrated in FIG. 4, the cold heat recovery system 1 described above includes the mixing rate acquisition device 16 described above, and a control device 17B configured to stop driving of the third cold heat recovery cycle 6 when the mixing rate of the second fuel acquired by the mixing rate acquisition device 16 is equal to or less than a predetermined value. The second fuel in the present embodiment includes hydrogen. The cold heat recovery system 1 in the present embodiment does not include the first bypass line 33 and the flow control valve 34 described above.

As illustrated in FIG. 4, the control device 17B includes the mixing rate determination unit 171 that determines whether or not the mixing rate of the second fuel (hydrogen) acquired by the mixing rate acquisition device 16 is equal to or less than a predetermined value, and the drive control unit 172 that stops driving of the third cold heat recovery cycle 6 when the mixing rate determination unit 171 determines that the mixing rate of the second fuel (hydrogen) is equal to or less than the predetermined value. The drive control unit 172 can stop driving of the third cold heat recovery cycle 6 by instructing the third pump 63 to stop and stopping driving of the third pump 63.

The control device 17B is an electronic control unit for controlling equipment included in the cold heat recovery system 1. The control device 17B is configured as a microcomputer including a processor (CPU) not illustrated, a memory such as a ROM and a RAM, a storage device such as an external storage device, an I/O interface, and a communication interface. The control device 17B may achieve control in each of the above-described units 171 and 172 of the control device 17B by the CPU operating (for example, calculation of data) according to a command of a program loaded to a main storage device of the memory, for example.

According to the configuration described above, the control device 17B stopping driving of the third cold heat recovery cycle 6 when the mixing rate of the second fuel acquired by the mixing rate acquisition device 16 is equal to or less than the predetermined value eliminates increasing the degree of subcooling of the first fuel having passed through the fourth heat exchanger 15. The cold heat recovery system 1 can be stably operated by stopping driving of the third cold heat recovery cycle 6 even when the mixing rate of hydrogen (second fuel) in the mixed fuel is low.

Figure 5:
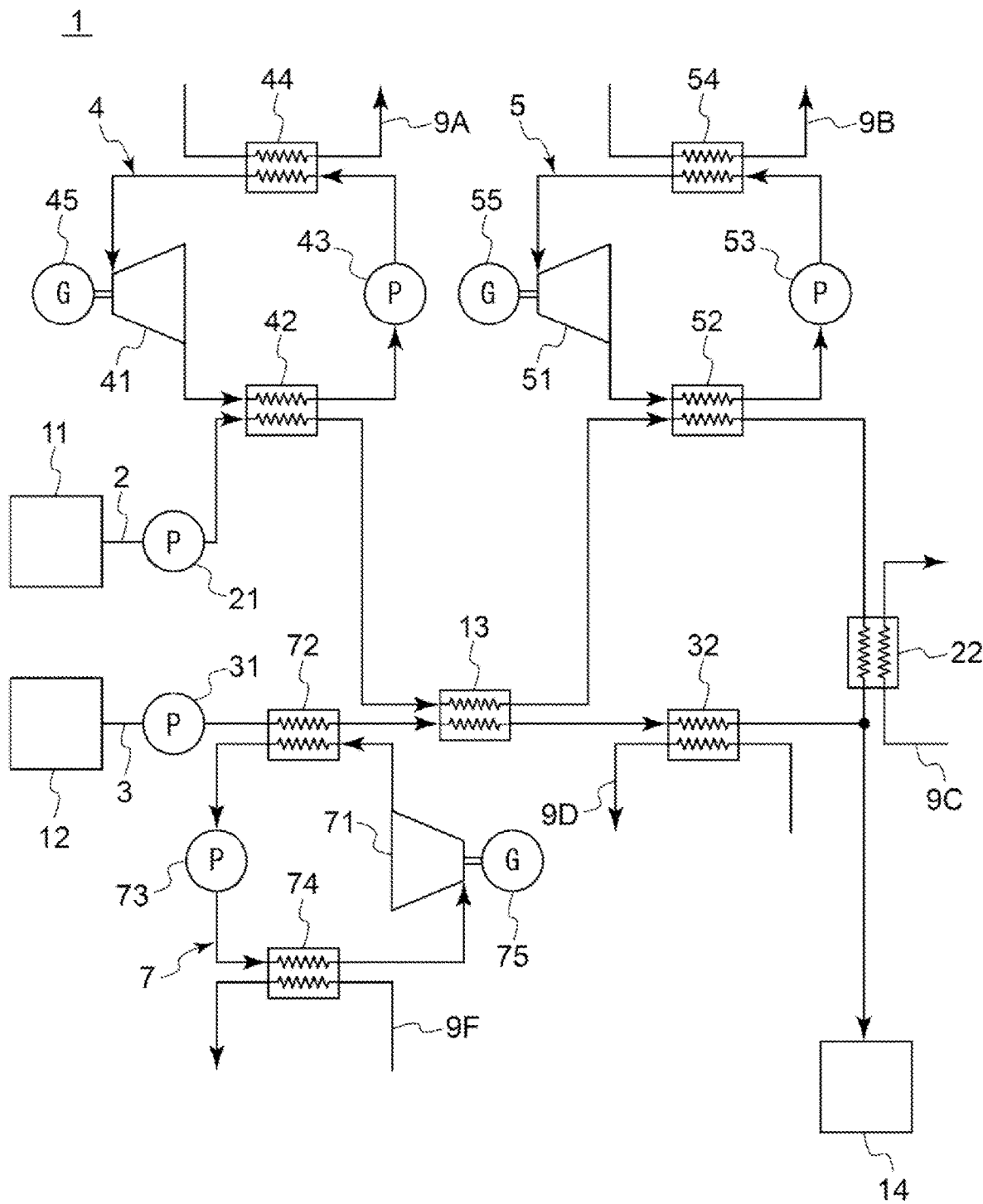
FIG. 5 is a schematic diagram of a cold heat recovery system according to one embodiment.
Figure 6:
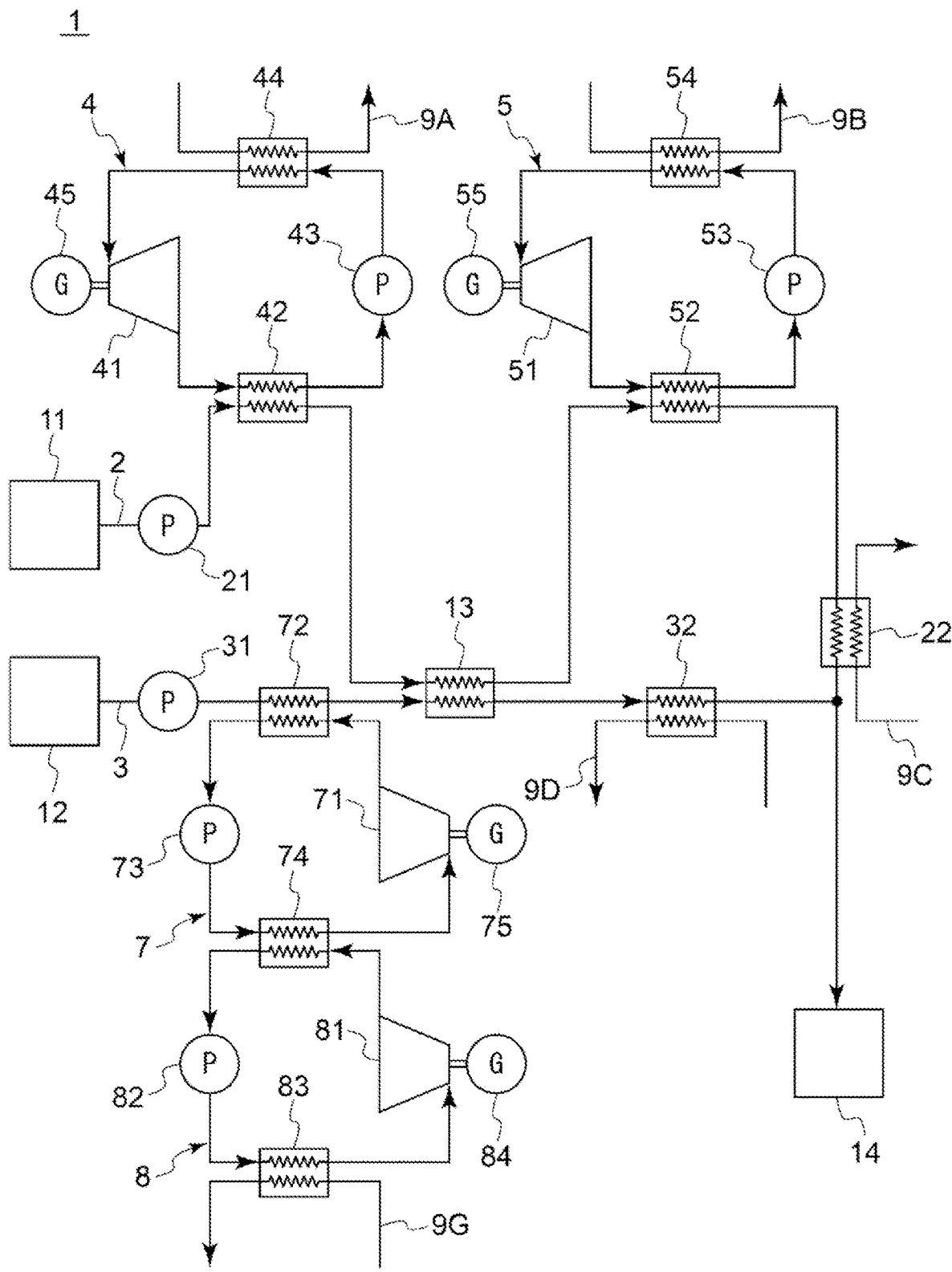
FIG. 6 is a schematic diagram of a cold heat recovery system according to one embodiment.
Figure 7:
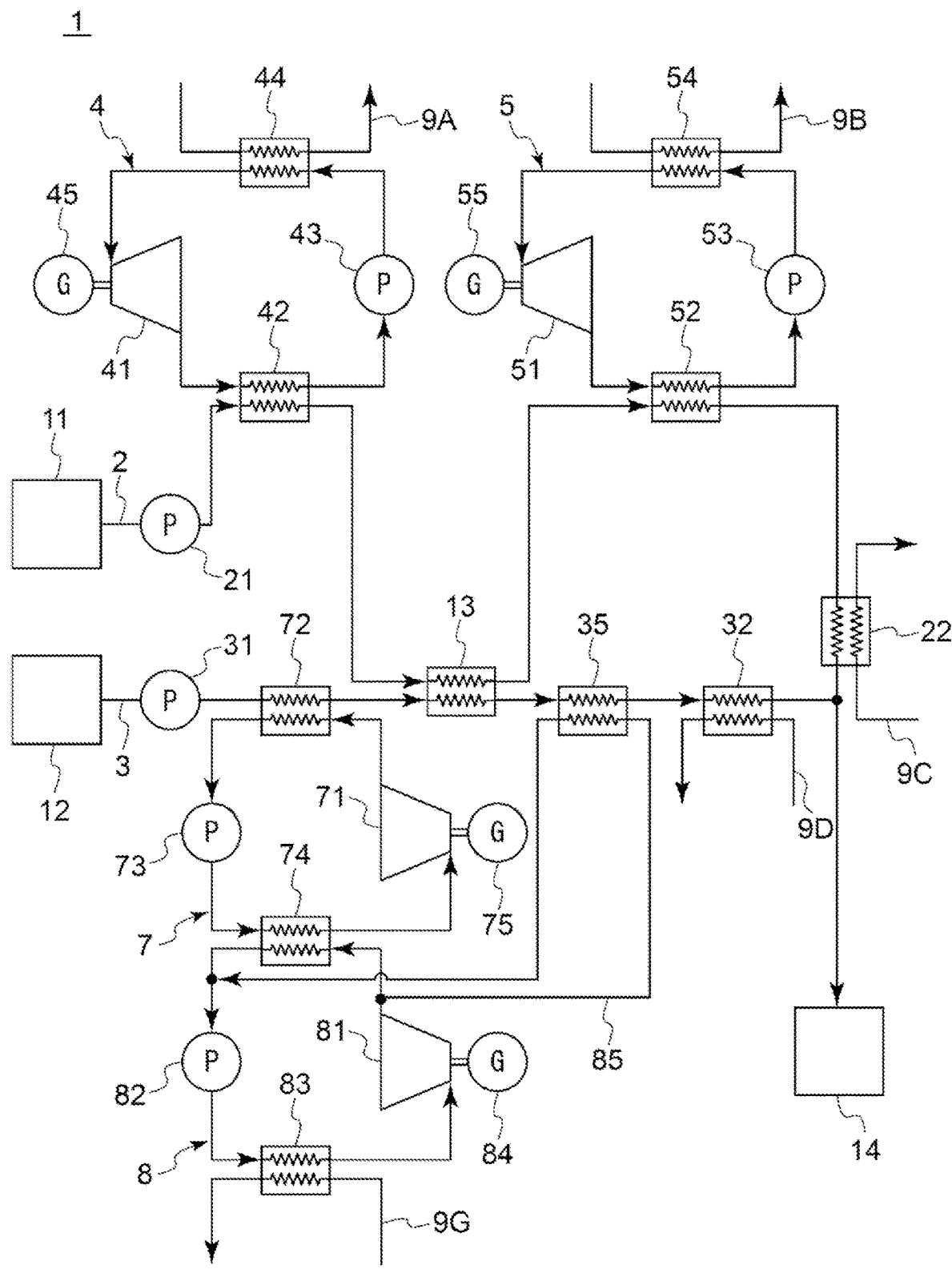
FIG. 7 is a schematic diagram of a cold heat recovery system according to one embodiment.

In some embodiments, as illustrated in FIGS. 5 to 7, the cold heat recovery system 1 described above further includes a fourth cold heat recovery cycle 7 and a sixth heat exchanger 72 provided on an upstream side of the second heat exchanger 13 on the second fuel supply line 3.

In the cold heat recovery system 1 in the present embodiment, the second fuel in a liquid state from the second fuel tank 12 is vaporized by heat exchange in the sixth heat exchanger 72. The second fuel from the sixth heat exchanger 72 flows into the second heat exchanger 13 in a gas state.

Fourth Cold Heat Recovery Cycle

The fourth cold heat recovery cycle 7 is formed of a circulation system configured to circulate the fourth heat medium. As illustrated in FIGS. 5 to 7, the fourth cold heat recovery cycle 7 includes a fourth expansion turbine 71, a fourth pump 73, and a fourth evaporator 74 that are provided on the fourth cold heat recovery cycle 7. The fourth cold heat recovery cycle 7 constitutes a heat exchange cycle (organic Rankine cycle) using the fourth heat medium as a working medium together with the sixth heat exchanger 72 provided on the fourth cold heat recovery cycle 7.

The fourth pump 73 is provided on a downstream side of the sixth heat exchanger 72 on the fourth cold heat recovery cycle 7. The fourth pump 73 is configured to boost pressure of the liquid fourth heat medium condensed in the sixth heat exchanger 72. Driving the fourth pump 73 causes the fourth heat medium to circulate on the fourth cold heat recovery cycle 7.

The fourth evaporator 74 is provided on a downstream side of the fourth pump 73 on the fourth cold heat recovery cycle 7. The liquid fourth heat medium boosted by the fourth pump 73 flows into the fourth evaporator 74. In the embodiment illustrated in FIG. 5, the fourth evaporator 74 is configured to evaporate the fourth heat medium by performing heat exchange between the heat medium (for example, seawater) flowing through a heat medium supply line 9F and the fourth heat medium flowing through the fourth cold heat recovery cycle 7. The fourth heat medium brought into a gas state by the fourth evaporator 74 is guided to the fourth expansion turbine 71.

The fourth expansion turbine 71 is provided on a downstream side of the fourth evaporator 74 and an upstream side of the sixth heat exchanger 72 on the fourth cold heat recovery cycle 7 and is configured to expand the fourth heat medium in a gas state. The fourth expansion turbine 71 is configured to expand the fourth heat medium in a gas state to recover the rotational power of the turbine from the fourth heat medium. As illustrated in FIGS. 5 to 7, the fourth cold heat recovery cycle 7 may further include a fourth generator 75 connected to the fourth expansion turbine 71. The fourth generator 75 is configured to be rotationally driven by the rotational power recovered by the fourth expansion turbine 71 to generate electric power.

The fourth cold heat recovery cycle 7 allows the fourth expansion turbine 71 to output power by cold energy recovered from the second fuel in the sixth heat exchanger 72. When the fourth cold heat recovery cycle 7 includes the fourth generator 75, the power output from the fourth expansion turbine 71 can be converted into electric power.

Sixth Heat Exchanger

The sixth heat exchanger 72 is provided on a downstream side of the second fuel pump 31 and an upstream side of the second heat exchanger 13 on the second fuel supply line 3. The sixth heat exchanger 72 is provided on a downstream side of the fourth expansion turbine 71 and an upstream side of the fourth pump 73 on the fourth cold heat recovery cycle 7. The sixth heat exchanger 72 is configured to function as an evaporator for evaporating the second fuel on the second fuel supply line 3 and to function as a condenser for condensing the fourth heat medium on the fourth cold heat recovery cycle 7.

The sixth heat exchanger 72 is configured to transfer cold energy from the second fuel flowing through the second fuel supply line 3 to the fourth heat medium flowing through the fourth cold heat recovery cycle 7. The sixth heat exchanger 72 includes a second fuel side flow path provided on the second fuel supply line 3 and through which the second fuel flows, and a fourth heat medium side flow path provided on the fourth cold heat recovery cycle 7 and through which the fourth heat medium having a temperature higher than that of the second fuel flowing through the second fuel side flow path flows. The sixth heat exchanger 72 is configured to allow heat exchange between the second fuel side flow path of the sixth heat exchanger 72 and the fourth heat medium side flow path of the sixth heat exchanger 72.

In the sixth heat exchanger 72, the second fuel flowing through the second fuel side flow path is heated and evaporated by the fourth heat medium flowing through the fourth heat medium side flow path. In the sixth heat exchanger 72, the fourth heat medium flowing through the fourth heat medium side flow path is cooled and condensed by the second fuel flowing through the second fuel side flow path. The second fuel from the second fuel pump 31 flows into the sixth heat exchanger 72 in a liquid state.

According to the configuration described above, when the second fuel stored in the second fuel tank 12 has sufficient cold energy, the cold heat recovery cycle 7 using the latent heat of the second fuel can be driven. Specifically, in the sixth heat exchanger 72, transferring the cold energy of the second fuel to the fourth heat medium allows the cold energy of the second fuel to be used as a cold source of the fourth cold heat recovery cycle 7. Therefore, the configuration described above enables cold heat recovery also in the fourth expansion turbine 71, allowing the output of the turbine of the cold heat recovery system 1 to be increased as a whole.

In some embodiments, as illustrated in FIGS. 6 and 7, the cold heat recovery system 1 described above further includes a fifth cold heat recovery cycle 8 configured to circulate a fifth heat medium having a higher freezing point than that of the fourth heat medium. The fourth evaporator 74 described above is provided on an upstream side of the fourth expansion turbine 71 on the fourth cold heat recovery cycle 7 and is configured to transfer thermal energy to the fourth heat medium from the fifth heat medium flowing through the fifth cold heat recovery cycle 8. As illustrated in FIGS. 6 and 7, the cold heat recovery cycle for recovering cold energy from the second fuel may have a two-stage configuration including the fourth cold heat recovery cycle 7 and the fifth cold heat recovery cycle 8.

Fifth Cold Heat Recovery Cycle

The fifth cold heat recovery cycle 8 is formed of a circulation system configured to circulate the fifth heat medium. As illustrated in FIGS. 6 and 7, the fifth cold heat recovery cycle 8 includes a fifth expansion turbine 81, a fifth pump 82, and a fifth evaporator 83 that are provided on the fifth cold heat recovery cycle 8. The fifth cold heat recovery cycle 8 constitutes a heat exchange cycle (organic Rankine cycle) using the fifth heat medium as a working medium together with the fourth evaporator 74 provided on the fifth cold heat recovery cycle 8.

The fifth pump 82 is provided on a downstream side of the fourth evaporator 74 on the fifth cold heat recovery cycle 8. The fifth pump 82 is configured to boost pressure of the liquid fifth heat medium condensed in the fourth evaporator 74. Driving the fifth pump 82 causes the fifth heat medium to circulate on the fifth cold heat recovery cycle 8.

The fifth evaporator 83 is provided on a downstream side of the fifth pump 82 on the fifth cold heat recovery cycle 8. The liquid fifth heat medium boosted by the fifth pump 82 flows into the fifth evaporator 83. The fifth evaporator 83 is configured to evaporate the fifth heat medium by performing heat exchange between the heat medium (for example, seawater) flowing through a heat medium supply line 9G and the fifth heat medium flowing through the fifth cold heat recovery cycle 8. The fifth heat medium brought into a gas state by the fifth evaporator 83 is guided to the fifth expansion turbine 81.

The fifth expansion turbine 81 is provided on a downstream side of the fifth evaporator 83 and an upstream side of the fourth evaporator 74 on the fifth cold heat recovery cycle 8 and is configured to expand the fifth heat medium in a gas state. The fifth expansion turbine 81 is configured to expand the fifth heat medium in a gas state to recover the rotational power of the turbine from the fifth heat medium. As illustrated in FIGS. 6 and 7, the fifth cold heat recovery cycle 8 may further include a fifth generator 84 connected to the fifth expansion turbine 81. The fifth generator 84 is configured to be rotationally driven by the rotational power recovered by the fifth expansion turbine 81 to generate electric power.

The fifth cold heat recovery cycle 8 allows the fifth expansion turbine 81 to output power from cold energy recovered from the fourth heat medium in the fourth evaporator 74. When the fifth cold heat recovery cycle 8 includes the fifth generator 84, the power output from the fifth expansion turbine 81 can be converted into electric power.

Fourth Evaporator

In the present embodiment, the fourth evaporator 74 is provided on a downstream side of the fourth pump 73 and an upstream side of the fourth expansion turbine 71 on the fourth cold heat recovery cycle 7. The fourth evaporator 74 is provided on a downstream side of the fifth expansion turbine 81 and an upstream side of the fifth pump 82 on the fifth cold heat recovery cycle 8. The fourth evaporator 74 is configured to function as an evaporator for evaporating the fourth heat medium on the fourth cold heat recovery cycle 7, and to function as a condenser for condensing the fifth heat medium on the fifth cold heat recovery cycle 8.

The fourth evaporator 74 is configured to transfer cold energy from the fourth heat medium flowing through the fourth cold heat recovery cycle 7 to the fifth heat medium flowing through the fifth cold heat recovery cycle 8. The fourth evaporator 74 includes the fourth heat medium side flow path provided on the fourth cold heat recovery cycle 7 and through which the fourth heat medium flows, and a fifth heat medium side flow path provided on the fifth cold heat recovery cycle 8 and through which the fifth heat medium having a temperature higher than that of the fourth heat medium flowing through the fourth heat medium side flow path flows. The fourth evaporator 74 is configured to allow heat exchange between the fourth heat medium side flow path of the fourth evaporator 74 and the fifth heat medium side flow path of the fourth evaporator 74.

In the fourth evaporator 74, the fourth heat medium flowing through the fourth heat medium side flow path is heated and evaporated by the fifth heat medium flowing through the fifth heat medium side flow path. In the fourth evaporator 74, the fifth heat medium flowing through the fifth heat medium side flow path is cooled and condensed by the fourth heat medium flowing through the fourth heat medium side flow path.

When the second fuel stored in the second fuel tank 12 has sufficient cold energy, the two-stage cold heat recovery cycles 7 and 8 using the latent heat of the second fuel can be driven. Specifically, in the fourth evaporator 74, the thermal energy of the fifth heat medium can be used as a heat source of the fourth cold heat recovery cycle 7, and the cold energy of the fourth heat medium can be used as a cold source of the fifth cold heat recovery cycle 8. Therefore, the configuration described above enables cold heat recovery also in the fifth expansion turbine 81, allowing the output of the turbine of the cold heat recovery system 1 to be increased as a whole.

In some embodiments, as illustrated in FIG. 7, the cold heat recovery system 1 described above further includes a second bypass line 85 provided on the fifth cold heat recovery cycle 8, the second fuel side heater (second fuel side first heater) 32 described above provided on a downstream side of the second heat exchanger 13 on the second fuel supply line 3, and a second fuel side second heater 35 provided on a downstream side of the second heat exchanger 13 and on an upstream side of the second fuel side first heater 32 on the second fuel supply line 3.

Second Bypass Line

The second bypass line 85 is configured to bypass the fourth evaporator 74 and guide the fifth heat medium to the fifth pump 82 from a downstream side of the fifth expansion turbine 81 on the fifth cold heat recovery cycle 8. The second bypass line 85 has one end (upstream end) connected to a downstream side of the fifth expansion turbine 81 on the fifth cold heat recovery cycle 8 and an upstream side of the fourth evaporator 74, and the other end (downstream end) connected to a downstream side of the fourth evaporator 74 and an upstream side of the fifth pump 82 on the fifth cold heat recovery cycle 8.

Second Fuel Side Second Heater

The second fuel side second heater 35 is configured to transfer thermal energy from the fifth heat medium flowing through the second bypass line 85 to the second fuel flowing through the second fuel supply line 3. The second fuel side second heater 35 includes a second fuel side flow path provided on the second fuel supply line 3 and through which the second fuel flows, and a fifth heat medium side flow path provided on the second bypass line 85 and through which the fifth heat medium having a temperature higher than that of the second fuel flowing through the second fuel side flow path flows. The second fuel side second heater 35 is configured to allow heat exchange between the second fuel side flow path of the second fuel side second heater 35 and the fifth heat medium side flow path of the second fuel side second heater 35.

In the second fuel side second heater 35, the second fuel flowing through the second fuel side flow path is heated by the fifth heat medium flowing through the fifth heat medium side flow path.

According to the configuration described above, a part of the fifth heat medium emitted from the fifth expansion turbine 81 on the fifth cold heat recovery cycle 8 is supplied to the second fuel side second heater 35 via the second bypass line 85, allowing the second fuel to be appropriately heated by heat exchange with the fifth heat medium in the second fuel side second heater 35. This can suppress freezing of the heat medium in the second fuel side first heater 32 provided on a downstream side of the second fuel side second heater on the second fuel supply line 3.

In some embodiments, the first fuel described above includes natural gas, and the second fuel described above includes hydrogen. In this case, the liquid first fuel (natural gas) stored in the first fuel tank 11 and the liquid second fuel (hydrogen) stored in the second fuel tank 12, which have sufficient cold energy, allows the turbines of the plurality of cold heat recovery cycles in the cold heat recovery system 1 to be driven by these cold energy. This allows the output of the turbine of the cold heat recovery system 1 to be increased as a whole.

Marine Vessel or Floating Body

Figure 8:
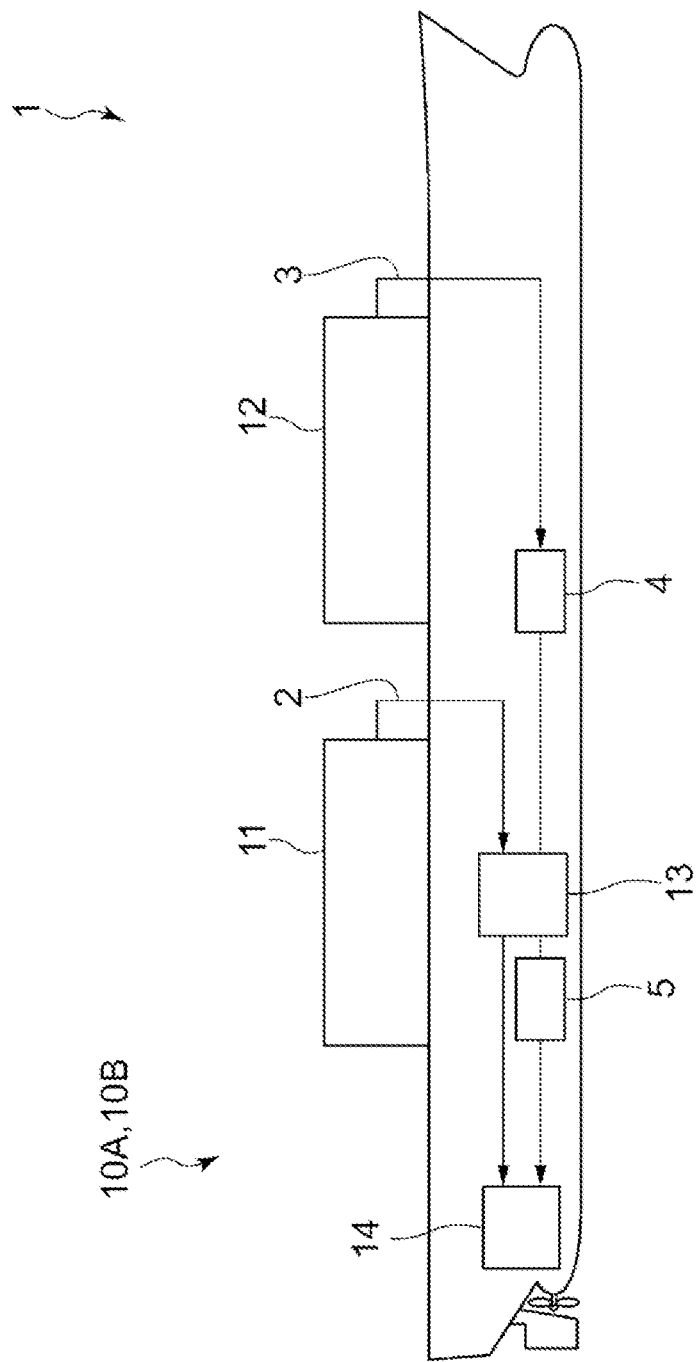
FIG. 8 is a schematic diagram of a marine vessel or a floating body including a cold heat recovery system according to one embodiment.

FIG. 8 is a schematic diagram of a marine vessel or a floating body including a cold heat recovery system according to one embodiment. As illustrated in FIG. 8, the marine vessel 10A or the floating body 10B according to some embodiments includes the cold heat recovery system 1 described above. According to the configuration described above, in the cold heat recovery system 1, the cold energy of the first fuel or the second fuel can be used as a cold source of a plurality of cold heat recovery cycles. The marine vessel 10A or the floating body 10B, which includes the cold heat recovery system 1, can increase output of the turbine (41, 51, or the like) as a whole as compared with a case where the cold heat recovery system 1 is not provided.

Each of the cold heat recovery cycles 4 to 8 included in the cold heat recovery system 1 may use the power (rotational force) recovered by the expansion turbine provided on the cold heat recovery cycle as it is as power by a power transmission device (for example, a coupling, a belt, a pulley, or the like) instead of converting the power into electric power.

Each of the first heat medium, the second heat medium, the third heat medium, the fourth heat medium, and the fifth heat medium has a boiling point and a freezing point lower than those of water. The heat media flowing through the heat medium supply lines 9A to 9G are preferably seawater or engine cooling water heated by cooling the engine, which can be easily acquired in the marine vessel 10A or the floating body 10B. The disclosure is also applicable to a case where the first fuel is a fuel other than natural gas and a case where the second fuel is a fuel other than hydrogen.

In the present specification, an expression of relative or absolute arrangement such as "in a direction", "along a direction", "parallel", "orthogonal", "centered", "concentric" or "coaxial" shall not be construed as indicating only the arrangement in a strict literal sense, and also includes a state where the arrangement is relatively displaced by a tolerance, or by an angle or a distance that can still achieve the same function.

For example, expressions indicating a state of being equal such as "same," "equal," or "uniform" shall not be construed as indicating only a state of being strictly equal but also as indicating a state in which there is a tolerance or a difference as long as the same function can be obtained.

In addition, in the present specification, an expression of a shape such as a rectangular shape or a cylindrical shape shall not be construed as only a geometrically strict shape, and also includes a shape with unevenness or chamfered corners or the like within the range in which the same effect can be achieved.

In addition, in the present specification, an expression such as "comprising", "including", or "having" one component is not intended to be exclusive of other components.

The disclosure is not limited to the above-described embodiments, and includes embodiments obtained by modifying the above-described embodiments and embodiments obtained by appropriately combining these embodiments.

30 The contents of the embodiments described above can be understood as follows, for example.

1) A cold heat recovery system (1) according to at least one embodiment of the disclosure includes
   a first fuel tank (11) configured to store first fuel in a liquid state.
   a second fuel tank (12) configured to store second fuel in a liquid state having a liquefaction temperature lower than a liquefaction temperature of the first fuel.
   a first fuel supply line (2) for sending the first fuel extracted from the first fuel tank (11).

a second fuel supply line (3) for sending the second fuel extracted from the second fuel tank (12).

a first cold heat recovery cycle (4) configured to circulate a first heat medium and including a first expansion turbine (41) for expanding the first heat medium in a gas state provided on the first cold heat recovery cycle (4), a first heat exchanger (42) provided on a downstream side of the first expansion turbine (41) on the first cold heat recovery cycle (4) and configured to transfer cold energy from the first fuel flowing through the first fuel supply line (2) to the first heat medium, a second heat exchanger (13) provided on a downstream side of the first heat exchanger (42) on the first fuel supply line (2) and configured to transfer cold energy from the second fuel flowing through the second fuel supply line (3) to the first fuel flowing through the first fuel supply line (2), a second cold heat recovery cycle (5) configured to circulate a second heat medium and including a second expansion turbine (51) for expanding the second heat medium in a gas state provided on the second cold heat recovery cycle (5), and a third heat exchanger (52) provided on a downstream side of the second expansion turbine (51) on the second cold heat recovery cycle (5) and configured to transfer cold energy to the second heat medium from the first fuel flowing on a downstream side of the second heat exchanger (13) on the first fuel supply line (2).

According to the configuration of 1) described above, reliquefying the first fuel allows the two cold heat recovery cycles (4 and 5) using the latent heat of the first fuel to be driven. Specifically, in the first heat exchanger (42), transferring the cold energy of the first fuel to the first heat medium allows the cold energy of the first fuel to be used as a cold source of the first cold heat recovery cycle (4). In the second heat exchanger (13), transferring cold energy of the second fuel to the first fuel allows the first fuel vaporized by heat exchange in the first heat exchanger (42) to be reliquefied. In the third heat exchanger (52), transferring the cold energy of the reliquefied first fuel to the second heat medium allows the cold energy of the first fuel to be used as a cold source of the second cold heat recovery cycle (5). Therefore, according to the configuration of 1) described above, reliquefying the first fuel enables cold heat recovery also in the second expansion turbine (51), allowing the output of the turbines (41 and 51) of the cold heat recovery system (1) to be increased as a whole as compared with a case where the first fuel is not reliquefied.

2) In some embodiments, the cold heat recovery system (1) according to 1) described above further includes a combustion device (14) configured to combust the first fuel and the second fuel, connected to a downstream side of the third heat exchanger (52) on the first fuel supply line (2), and connected to a downstream side of the second heat exchanger (13) the second fuel supply line (3).

According to the configuration of 2) described above, the first fuel guided to the combustion device (14) is vaporized by cold energy being recovered in the third heat exchanger (52). The second fuel guided to the combustion device (14) is vaporized by cold energy being recovered in the second heat exchanger (13). The vaporized first fuel or second fuel can be used as fuel in the combustion device (14). This can suppress the first fuel and the second fuel from being supplied to the combustion device (14) without being sufficiently vaporized and thus can suppress failure and malfunction of the combustion device (14).

3) Some embodiments, are the cold heat recovery system (1) according to 1) or 2) described above includes the first cold heat recovery cycle (4) further includes
a first pump (43) for boosting pressure of the first heat medium provided on a downstream side of the first heat exchanger (42) on the first cold heat recovery cycle (4) and a first evaporator (44) for evaporating the first heat medium provided on a downstream side of the first pump (43) on the first cold heat recovery cycle (4), and the second cold heat recovery cycle (5) further includes
a second pump (53) for boosting pressure of the second heat medium provided on a downstream side of the third heat exchanger (52) on the second cold heat recovery cycle (5) and a second evaporator (54) for evaporating the second heat medium provided on a downstream side of the second pump (53) on the second cold heat recovery cycle (5).

According to the configuration of 3) described above, the first cold heat recovery cycle (4) constitutes the heat exchange cycle (organic Rankine cycle) using the first heat medium as a working medium together with the first heat exchanger (42), allowing the first expansion turbine (41) to be driven by cold energy recovered from the first fuel. The second cold heat recovery cycle (5) constitutes the heat exchange cycle (organic Rankine cycle) using the second heat medium as a working medium together with the third heat exchanger (52), allowing the second expansion turbine (51) to be driven by cold energy recovered from the first fuel. Therefore, according to the configuration of 3) described above, the cold energy recovered from the first fuel can be converted into power by the first expansion turbine (41) and the second expansion turbine (51).

4) In some embodiments, the cold heat recovery system (1) according to any of 1) to 3) described above includes a fourth heat exchanger (15) provided on a downstream side of the third heat exchanger (52) on the first fuel supply line (2) and configured to transfer cold energy from the second fuel flowing on a downstream side of the second heat exchanger (13) on the second fuel supply line (3) to the first fuel flowing through the first fuel supply line (2), a third cold heat recovery cycle (6) configured to circulate a third heat medium, the third cold heat recovery cycle (6) including a third expansion turbine (61) for expanding the third heat medium in a gas state provided on the third cold heat recovery cycle (6), and a fifth heat exchanger (62) provided on a downstream side of the third expansion turbine (61) on the third cold heat recovery cycle (6) and configured to transfer cold energy to the third heat medium from the first fuel flowing on a downstream side of the fourth heat exchanger (15) on the first fuel supply line (2).

According to the configuration of 4) described above, when the second fuel stored in the second fuel tank (12) has sufficient cold energy, the reliquefaction of the first fuel can be performed twice. This can drive the three cold heat recovery cycles (4, 5, and 6) using the latent heat of the first fuel. Specifically, in the fourth heat exchanger (15), transferring cold energy of the second fuel to the first fuel allows the first fuel vaporized by heat exchange in the third heat exchanger (52) to be reliquefied. In the fourth heat exchanger (15), transferring the cold energy of the reliquefied first fuel to the third heat medium allows the cold energy of the first fuel to be used as a cold source of the third cold heat recovery cycle (6). Therefore, according to the configuration of 4) described above, reliquefying the first fuel twice enables cold heat recovery also in the third expansion turbine (61), allowing the output of the turbines (41, 51, and 61) of the cold heat recovery system (1) to be increased as a whole as compared with a case where the first fuel is reliquefied once.

5) Some embodiments are the cold heat recovery system (1) according to 4) described above,
the third cold heat recovery cycle (6) includes
a third pump (63) for boosting pressure of the third heat medium provided on a downstream side of the fifth heat exchanger (62) on the third cold heat recovery cycle (6), and
a third evaporator (64) for evaporating the third heat medium provided on a downstream side of the third pump (63) on the third cold heat recovery cycle (6).

According to the configuration of 5) described above, the third cold heat recovery cycle (6) constitutes the heat exchange cycle (organic Rankine cycle) using the third heat medium as a working medium together with the fifth heat exchanger (62), allowing the third expansion turbine (61) to be driven by cold energy recovered from the first fuel. Therefore, according to the configuration of 5) described above, the cold energy recovered from the first fuel can be converted into power by the third expansion turbine (61).

6) In some embodiments, the cold heat recovery system (1) according to 4) or 5) described above further includes
a first bypass line (33) for bypassing the second heat exchanger (13) and guiding the second fuel to the fourth heat exchanger (15) from an upstream side of the second heat exchanger (13) on the second fuel supply line (3), and
a flow control valve (34) provided between a connection position at an upstream end of the first bypass line (33) on the second fuel supply line (3) and the second heat exchanger (13) and configured to regulate a flow rate of the second fuel passing through the flow control valve (34).

According to the configuration of 6) described above, reducing the opening degree of the flow control valve (34) can guide at least a part of the second fuel to the fourth heat exchanger (15) through the first bypass line (33). Since the second fuel guided to the fourth heat exchanger (15) through the first bypass line (33) has unrecovered cold energy in the second heat exchanger (13), the degree of subcooling of the first fuel having passed through the fourth heat exchanger (15) can be increased. Increasing the degree of subcooling of the first fuel having passed through the fourth heat exchanger (15) can increase a cold heat recovery amount by the third expansion turbine (61) using, as a cold source, the cold energy of the first fuel having passed through the fourth heat exchanger (15), as compared with a case where the first bypass line (33) is not provided.

7) Some embodiments are the cold heat recovery system (1) according to 6) described above,
the second fuel includes hydrogen, and
the cold heat recovery system (1) includes
a combustion device (14) configured to combust the first fuel and the second fuel, connected to a downstream side of the third heat exchanger (52) on the first fuel supply line (2), and connected to a downstream side of the second heat exchanger (13) on the second fuel supply line (3),
a mixing rate acquisition device (16) configured to acquire mixing rates of the first fuel and the second fuel guided to the combustion device (14), and
a control device (17A) configured to stop driving of either the first cold heat recovery cycle (4) or the second cold heat recovery cycle (5) when the mixing rate of the second fuel acquired by the mixing rate acquisition device (16) is equal to or less than a predetermined value.

The higher the mixing rate of hydrogen (second fuel) in the mixed fuel supplied to the combustion device (14) is, the more the emission rate of nitrogen oxides in the combustion device (14) increases, and thus the mixing rate of hydrogen (second fuel) in the mixed fuel may be limited to be able to comply with nitrogen oxide emission regulations. For example, in a case where a marine vessel (10A) or a floating body (10B) on which the cold heat recovery system (1) is equipped and driven navigates a sea area where the nitrogen oxide emission regulations is strict, it is necessary to intentionally lower the mixing rate of hydrogen (second fuel) in the mixed fuel. In a case where the mixing rate of hydrogen (second fuel) in the mixed fuel is low, the first fuel cannot be sufficiently cooled by the cold energy of the second fuel, and the degree of subcooling of the first fuel that having passed through the fourth heat exchanger (15) may decrease. According to the configuration of 7) described above, stopping driving of either the first cold heat recovery cycle (4) or the second cold heat recovery cycle (5) when the mixing rate of the second fuel acquired by the mixing rate acquisition device (16) is equal to or less than the predetermined value allows the control device (17A) to increase the degree of subcooling of the first fuel having passed through the fourth heat exchanger (15). The cold heat recovery system (1) can be stably operated even when the mixing rate of hydrogen (second fuel) in the mixed fuel is low.

According to the configuration of 7) described above, regulating the opening degree of the flow control valve (34) allows the cold heat recovery system (1) to regulate the degree of subcooling of the first fuel having passed through the fourth heat exchanger (15) without regulating the pressure in the third cold heat recovery cycle (6). Therefore, the cold heat recovery system (1) including the first bypass line (33) and the flow control valve (34) can suppress complication of the operation control of the third cold heat recovery cycle (6).

8) Some embodiments are the cold heat recovery system (1) according to any of 4) to 6) described above,
the second fuel includes hydrogen, and
the cold heat recovery system (1) includes
a combustion device (14) configured to combust the first fuel and the second fuel, connected to a downstream side of the third heat exchanger (52) on the first fuel supply line (2), and connected to a downstream side of the second heat exchanger (13) on the second fuel supply line (3),
a mixing rate acquisition device (16) configured to acquire mixing rates of the first fuel and the second fuel guided to the combustion device (14), and
a control device (17B) configured to stop driving of the third cold heat recovery cycle when the mixing rate of the second fuel acquired by the mixing rate acquisition device (16) is equal to or less than a predetermined value.

According to the configuration of 8) described above, the control device (17B) stopping driving of the third cold heat recovery cycle (6) when the mixing rate of the second fuel acquired by the mixing rate acquisition device (16) is equal to or less than the predetermined value eliminates increasing the degree of subcooling of the first fuel having passed through the fourth heat exchanger (15). The cold heat recovery system (1) can be stably operated by stopping driving of the third cold heat recovery cycle (6) even when the mixing rate of hydrogen (second fuel) in the mixed fuel is low.

9) In some embodiments, the cold heat recovery system (1) according to any of 1) to 8) described above further includes
- a fourth cold heat recovery cycle (7) configured to circulate a fourth heat medium, the fourth cold heat recovery cycle (7) including a fourth expansion turbine (71) for expanding the fourth heat medium in a gas state provided on the fourth cold heat recovery cycle (7), and
- a sixth heat exchanger (72) provided on a downstream side of the fourth expansion turbine (71) on the fourth cold heat recovery cycle (7) and configured to transfer cold energy to the fourth heat medium from the second fuel flowing on an upstream side of the second heat exchanger (13) on the second fuel supply line (3).

According to the configuration of 9) described above, when the second fuel stored in the second fuel tank (12) has sufficient cold energy, the cold heat recovery cycle (7) using the latent heat of the second fuel can be driven. Specifically, in the sixth heat exchanger (72), transferring the cold energy of the second fuel to the fourth heat medium allows the cold energy of the second fuel to be used as a cold source of the fourth cold heat recovery cycle (7). Therefore, the configuration of 9) described above enables cold heat recovery also in the fourth expansion turbine (71), allowing the output of the turbines (41, 51, 71, and the like) of the cold heat recovery system (1) to be increased as a whole.

10) In some embodiments, the cold heat recovery system (1) according to 9) described above further includes
- a fifth cold heat recovery cycle (8) configured to circulate a fifth heat medium having a higher freezing point than a freezing point of the fourth heat medium, the fifth cold heat recovery cycle (8) including a fifth expansion turbine (81) for expanding the fifth heat medium in a gas state provided on the fifth cold heat recovery cycle (8), and
- a fourth evaporator (74) provided on an upstream side of the fourth expansion turbine (71) on the fourth cold heat recovery cycle (7), and configured to transfer thermal energy to the fourth heat medium from the fifth heat medium flowing on a downstream side of the fifth expansion turbine (71) on the fifth cold heat recovery cycle (8).

According to the configuration of 10) described above, when the second fuel stored in the second fuel tank (12) has sufficient cold energy, the two-stage cold heat recovery cycles (7 and 8) using the latent heat of the second fuel can be driven. Specifically, in the fourth evaporator (74), the thermal energy of the fifth heat medium can be used as a heat source of the fourth cold heat recovery cycle (7), and the cold energy of the fourth heat medium can be used as a cold source of the fifth cold heat recovery cycle (8). Therefore, the configuration of 10) described above enables cold heat recovery also in the fifth expansion turbine (81), allowing the output of the turbines (41, 51, 71, 81, and the like) of the cold heat recovery system (1) to be increased as a whole.

11) Some embodiments are the cold heat recovery system (1) according to 10) described above,
the fourth cold heat recovery cycle (7) further includes
a fourth pump (73) for boosting pressure of the fourth heat medium provided on a downstream side of the sixth heat exchanger (72) and an upstream side of the fourth evaporator (74) on the fourth cold heat recovery cycle (7), and the fifth cold heat recovery cycle (8) further includes
a fifth pump (82) for boosting pressure of the fifth heat medium provided on a downstream side of the fourth evaporator (74) on the fifth cold heat recovery cycle (8) and
a fifth evaporator (83) for evaporating the fifth heat medium provided on a downstream side of the fifth pump (82) on the fifth cold heat recovery cycle (8).

According to the configuration of 11) described above, the fourth cold heat recovery cycle (7) constitutes the heat exchange cycle (organic Rankine cycle) using the fourth heat medium as a working medium together with the sixth heat exchanger (72) and the fourth evaporator (74), allowing the fourth expansion turbine (71) to be driven by cold energy recovered from the second fuel. The fifth cold heat recovery cycle (8) constitutes the heat exchange cycle (organic Rankine cycle) using the fifth heat medium as a working medium together with the fourth evaporator (74), allowing the fifth expansion turbine (81) to be driven by cold energy recovered from the second fuel via the fourth heat medium. Therefore, according to the configuration of 11) described above, the cold energy recovered from the second fuel can be converted into power by the fourth expansion turbine (71) and the fifth expansion turbine (81).

12) In some embodiments, the cold heat recovery system (1) according to 11) described above further includes
- a second bypass line (85) for bypassing the fourth evaporator (74) and guiding the fifth heat medium to the fifth pump (82) from a downstream side of the fifth expansion turbine (81) on the fifth cold heat recovery cycle (8),
- a second fuel side first heater (32) for heating the second fuel provided on a downstream side of the second heat exchanger (13) on the second fuel supply line (3), and
- a second fuel side second heater (35) for heating the second fuel provided on a downstream side of the second heat exchanger (13) and an upstream side of the second fuel side first heater (32) on the second fuel supply line.

The second fuel side second heater (35) is configured to transfer thermal energy from the fifth heat medium flowing through the second bypass line (85) to the second fuel flowing through the second fuel supply line (3).

According to the configuration of 12) described above, a part of the fifth heat medium emitted from the fifth expansion turbine (81) on the fifth cold heat recovery cycle (8) is supplied to the second fuel side second heater (35) via the second bypass line (85), allowing the second fuel to be appropriately heated by heat exchange with the fifth heat medium in the second fuel side second heater (35). This can suppress freezing of the heat medium in the second fuel side first heater (32) provided on a downstream side of the second fuel side second heater (35) on the second fuel supply line (3).

13) Some embodiments are the cold heat recovery system (1) according to any of 1) to 12) described above,
the first fuel includes natural gas, and
the second fuel includes hydrogen.

According to the configuration of 13) described above, the liquid first fuel (natural gas) stored in the first fuel tank and the liquid second fuel (hydrogen) stored in the second fuel tank have sufficient cold energy, allowing the output of the turbines (41, 51, and the like) of the cold heat recovery system (1) to be increased as a whole.

14) The marine vessel (10A) or the floating body (10B) according to at least one embodiment of the present disclosure includes the cold heat recovery system (1) according to any of 1) to 13) described above.

According to the configuration of 14) described above, in the cold heat recovery system (1), the cold energy of the first fuel or the second fuel can be used as a cold source of a plurality of cold heat recovery cycles (1). The marine vessel or the floating body described in 14) above, which includes the cold heat recovery system (1), can increase the output of the turbines (41, 51, and the like) as compared with a case where the cold heat recovery system (1) is not provided.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A cold heat recovery system, comprising:
   a first fuel tank configured to store first fuel in a liquid state;
   a second fuel tank configured to store second fuel in a liquid state having a liquefaction temperature lower than a liquefaction temperature of the first fuel;
   a first fuel supply line for sending the first fuel extracted from the first fuel tank;
   a second fuel supply line for sending the second fuel extracted from the second fuel tank;
   a first cold heat recovery cycle configured to circulate a first heat medium and including a first expansion turbine for expanding the first heat medium in a gas state provided on the first cold heat recovery cycle;
   a first heat exchanger provided on a downstream side of the first expansion turbine on the first cold heat recovery cycle and configured to transfer cold energy from the first fuel flowing through the first fuel supply line to the first heat medium;
   a second heat exchanger provided on a downstream side of the first heat exchanger on the first fuel supply line and configured to transfer cold energy from the second fuel flowing through the second fuel supply line to the first fuel flowing through the first fuel supply line;
   a second cold heat recovery cycle configured to circulate a second heat medium and including a second expansion turbine for expanding the second heat medium in a gas state provided on the second cold heat recovery cycle;
   a third heat exchanger provided on a downstream side of the second expansion turbine on the second cold heat recovery cycle and configured to transfer cold energy to the second heat medium from the first fuel flowing on a downstream side of the second heat exchanger on the first fuel supply line;
   a fourth heat exchanger provided on a downstream side of the third heat exchanger on the first fuel supply line and configured to transfer cold energy from the second fuel flowing on a downstream side of the second heat exchanger on the second fuel supply line to the first fuel flowing through the first fuel supply line;
   a third cold heat recovery cycle configured to circulate a third heat medium and including a third expansion turbine for expanding the third heat medium in a gas state provided on the third cold heat recovery cycle; and
   a fifth heat exchanger provided on a downstream side of the third expansion turbine on the third cold heat recovery cycle and configured to transfer cold energy to the third heat medium from the first fuel flowing on a downstream side of the fourth heat exchanger on the first fuel supply line;
   a first bypass line for bypassing the second heat exchanger and guiding the second fuel to the fourth heat exchanger from an upstream side of the second heat exchanger on the second fuel supply line; and
   a flow control valve provided between a connection position at an upstream end of the first bypass line on the second fuel supply line and the second heat exchanger and configured to regulate a flow rate of the second fuel passing through the flow control valve.

2. The cold heat recovery system according to claim 1, further comprising
   a combustion device configured to combust the first fuel and the second fuel, connected to a downstream side of the third heat exchanger on the first fuel supply line, and connected to a downstream side of the second heat exchanger on the second fuel supply line.

3. The cold heat recovery system according to claim 1, wherein
   the first cold heat recovery cycle further includes
   a first pump for boosting pressure of the first heat medium provided on a downstream side of the first heat exchanger on the first cold heat recovery cycle and
   a first evaporator for evaporating the first heat medium provided on a downstream side of the first pump on the first cold heat recovery cycle, and
   the second cold heat recovery cycle further includes
   a second pump for boosting pressure of the second heat medium provided on a downstream side of the third heat exchanger on the second cold heat recovery cycle and
   a second evaporator for evaporating the second heat medium provided on a downstream side of the second pump on the second cold heat recovery cycle.

4. The cold heat recovery system according to claim 1, wherein
   the third cold heat recovery cycle includes
   a third pump for boosting pressure of the third heat medium provided on a downstream side of the fifth heat exchanger on the third cold heat recovery cycle and
   a third evaporator for evaporating the third heat medium provided on a downstream side of the third pump on the third cold heat recovery cycle.

5. The cold heat recovery system according to claim 1, wherein
   the second fuel includes hydrogen, and
   the cold heat recovery system further includes
   a combustion device configured to combust the first fuel and the second fuel, connected to a downstream side of the third heat exchanger on the first fuel supply line, and connected to a downstream side of the second heat exchanger on the second fuel supply line,
   a mixing rate acquisition device configured to acquire mixing rates of the first fuel and the second fuel guided to the combustion device, and
   a control device configured to stop driving of either the first cold heat recovery cycle or the second cold heat recovery cycle when the mixing rate of the second fuel acquired by the mixing rate acquisition device is equal to or less than a predetermined value.

6. The cold heat recovery system according to claim 1, wherein
   the second fuel includes hydrogen, and
   the cold heat recovery system further includes a combustion device configured to combust the first fuel and the second fuel, connected to a downstream side of the third heat exchanger on the first fuel supply line, and connected to a downstream side of the second heat exchanger on the second fuel supply line, a mixing rate acquisition device configured to acquire mixing rates of the first fuel and the second fuel guided to the combustion device, and a control device configured to stop driving of the third cold heat recovery cycle when the mixing rate of the second fuel acquired by the mixing rate acquisition device is equal to or less than a predetermined value.

7. The cold heat recovery system according to claim 1, further comprising:

a fourth cold heat recovery cycle configured to circulate a fourth heat medium and including a fourth expansion turbine for expanding the fourth heat medium in a gas state provided on the fourth cold heat recovery cycle; and a sixth heat exchanger provided on a downstream side of the fourth expansion turbine on the fourth cold heat recovery cycle and configured to transfer cold energy to the fourth heat medium from the second fuel flowing on an upstream side of the second heat exchanger on the second fuel supply line.

8. The cold heat recovery system according to claim 7, further comprising:

a fifth cold heat recovery cycle configured to circulate a fifth heat medium having a higher freezing point than a freezing point of the fourth heat medium and including a fifth expansion turbine for expanding the fifth heat medium in a gas state provided on the fifth cold heat recovery cycle; and a fourth evaporator provided on an upstream side of the fourth expansion turbine on the fourth cold heat recovery cycle, and configured to transfer thermal energy to the fourth heat medium from the fifth heat medium flowing on a downstream side of the fifth expansion turbine on the fifth cold heat recovery cycle.

9. The cold heat recovery system according to claim 8, wherein the fourth cold heat recovery cycle further includes a fourth pump for boosting pressure of the fourth heat medium provided on a downstream side of the sixth heat exchanger and an upstream side of the fourth evaporator on the fourth cold heat recovery cycle, and the fifth cold heat recovery cycle further includes a fifth pump for boosting pressure of the fifth heat medium provided on a downstream side of the fourth evaporator on the fifth cold heat recovery cycle, and a fifth evaporator for evaporating the fifth heat medium provided on a downstream side of the fifth pump on the fifth cold heat recovery cycle.

10. The cold heat recovery system according to claim 9 further comprising:

a second bypass line for bypassing the fourth evaporator and guiding the fifth heat medium to the fifth pump from a downstream side of the fifth expansion turbine on the fifth cold heat recovery cycle;

a second fuel side first heater for heating the second fuel provided on a downstream side of the second heat exchanger on the second fuel supply line; and a second fuel side second heater for heating the second fuel provided on a downstream side of the second heat exchanger and an upstream side of the second fuel side first heater on the second fuel supply line, wherein the second fuel side second heater is configured to transfer thermal energy from the fifth heat medium flowing through the second bypass line to the second fuel flowing through the second fuel supply line.

11. The cold heat recovery system according to claim 1, wherein the first fuel includes natural gas, and the second fuel includes hydrogen.

12. A marine vessel or a floating body, comprising:

the cold heat recovery system according to claim 1.

* * * * *